US012003305B2

United States Patent
Gurelli et al.

(10) Patent No.: US 12,003,305 B2
(45) Date of Patent: Jun. 4, 2024

(54) INITIAL ACQUISITION AND BEAM REFINEMENT FROM AN INTELLIGENT REFLECTING SURFACE USING DEFOCUSED BEAMS

(71) Applicant: QUALCOMM Incorporated, San Diego, CA (US)

(72) Inventors: Mehmet Izzet Gurelli, San Diego, CA (US); Qiang Wu, San Diego, CA (US); Junyi Li, Fairless Hills, PA (US); Raju Hormis, New York, NY (US); Tao Luo, San Diego, CA (US); Navid Abedini, Basking Ridge, NJ (US); Ozge Koymen, Princeton, NJ (US); Farideddin Fayazbakhsh, Chatham, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 17/402,463

(22) Filed: Aug. 13, 2021

(65) Prior Publication Data
US 2023/0051630 A1 Feb. 16, 2023

(51) Int. Cl.
*H04B 7/06* (2006.01)
*H04B 7/0408* (2017.01)

(52) U.S. Cl.
CPC ......... *H04B 7/0695* (2013.01); *H04B 7/0408* (2013.01)

(58) Field of Classification Search
None
See application file for complete search history.

(56) References Cited

U.S. PATENT DOCUMENTS 11,546,022 B2 1/2023 Dunna et al.
11,677,145 B1 6/2023 Sharma
(Continued)

FOREIGN PATENT DOCUMENTS

CN 111986741 A 11/2020
CN 113225276 A 8/2021
(Continued)

OTHER PUBLICATIONS

Elmossallamy M.A., et al., "Reconfigurable Intelligent Surfaces for Wireless Communications: Principles, Challenges, and Opportunities", IEEE Transactions on Cognitive Communications and Networking, arXiv:2005.00938v1 [eess.SP], May 2, 2020, pp. 1-12.
(Continued)

*Primary Examiner* — Minh Trang T Nguyen
(74) *Attorney, Agent, or Firm* — Procopio, Cory, Hargreaves & Savitch

(57) ABSTRACT

A base station may identify one or more beams toward a node for communication with at least one UE. The one or more beams may correspond to a plurality of beams from the node. The base station may transmit, to the node, an indication to adjust a surface phase of the node corresponding to the one or more beams or one of the plurality of beams from the node. The base station may select at least one beam of the plurality of beams from the node for communication with the at least one UE. The base station may communicate with the at least one UE via the node and the at least one beam. The at least one beam of the plurality of beams from the node may be based on a defocusing operation associated with a virtual focal point.

30 Claims, 18 Drawing Sheets

(56) References Cited

U.S. PATENT DOCUMENTS

| | | | |
|---|---|---|---|
| 2022/0014935 A1 | 1/2022 | Haija et al. | |
| 2022/0052764 A1 | 2/2022 | Medra et al. | |
| 2022/0060238 A1* | 2/2022 | Jassal | H04L 5/0048 |
| 2022/0216908 A1 | 7/2022 | Choi et al. | |
| 2022/0231753 A1 | 7/2022 | Bengtsson et al. | |
| 2022/0344826 A1 | 10/2022 | Chowdhury et al. | |
| 2023/0022225 A1 | 1/2023 | Gunturu et al. | |
| 2023/0030324 A1 | 2/2023 | Ali et al. | |
| 2023/0043800 A1 | 2/2023 | Khojastepour et al. | |
| 2023/0047993 A1 | 2/2023 | Jian et al. | |
| 2023/0048721 A1 | 2/2023 | Gurelli | |
| 2023/0063645 A1 | 3/2023 | Gurelli et al. | |
| 2023/0180020 A1 | 6/2023 | Gurelli et al. | |
| 2023/0208479 A1 | 6/2023 | Wang et al. | |
| 2023/0266457 A1 | 8/2023 | Gurelli et al. | |

FOREIGN PATENT DOCUMENTS

| | | |
|---|---|---|
| CN | 113645163 A | 11/2021 |
| JP | 6559737 B2 | 8/2019 |
| KR | 20200010151 A | 1/2020 |
| WO | 2019045756 A1 | 3/2019 |
| WO | 2021223863 A1 | 11/2021 |
| WO | 2022063435 A1 | 3/2022 |
| WO | 2022073618 A1 | 4/2022 |

OTHER PUBLICATIONS

Tang W., et al., "Wireless Communications with Reconfigurable Intelligent Surface: Path Loss Modeling and Experimental Measurement", IEEE Transactions on Wireless Communications, arXiv:1911.05326v2 [eess.SP], Sep. 14, 2020, pp. 1-32, https://arxiv.org/pdf/1911.05326.pdf.

Wu Q., et al., "cdma2000 Highly Detectable Pilot", IEEE International Conference on Communications Workshops, 2008. ICC Workshops, IEEE, Piscataway, NJ, USA, May 19, 2008 (May 19, 2008), pp. 16-20, XP031265196, ISBN: 978-1-4244-2052-0, p. 1, Left-Hand Column, Line 8—p. 1, Right Hand Column, Line 31, https://ieeexplore.ieee.org/abstract/document/4531856.

Wu Q., et al., "Intelligent Reflecting Surface Aided Wireless Communications: A Tutorial", IEEE Transactions on Communications, arXiv:2007.02759v2 [cs.IT], Jul. 7, 2020, pp. 1-74, https://arxiv.org/pdf/2007.02759v2.pdf.

Wu Q., et al., "Towards Smart and Reconfigurable Environment: Intelligent Reflecting Surface Aided Wireless Network", IEEE Communications Magazine, Jan. 2020, pp. 106-112, DOI:10.1109/MCOM.001.1900107.

Zheng B., et al., "Intelligent Reflecting Surface-Enhanced OFDM: Channel Estimation and Reflection Optimization", IEEE Wireless Communications Letters, vol. 9, No. 4, Apr. 2020, pp. 1-5, arXiv:1909.03272v3 [cs.IT] [Jan. 29, 2020], https://arxiv.org/pdf/1909.03272.pdf.

* cited by examiner

… (1)

INITIAL ACQUISITION AND BEAM REFINEMENT FROM AN INTELLIGENT REFLECTING SURFACE USING DEFOCUSED BEAMS

TECHNICAL FIELD

The present disclosure relates generally to communication systems, and more particularly, to forming beam suitable for communication with one or more user equipments (UEs) at an intelligent reflecting surface (IRS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a base station. The apparatus may identify one or more beams toward a node for communication with at least one UE. The one or more beams may correspond to a plurality of beams from the node. The apparatus may transmit, to the node, an indication to adjust a surface phase of the node corresponding to the one or more beams or one of the plurality of beams from the node. The apparatus may select at least one beam of the plurality of beams from the node for communication with the at least one UE. The at least one beam may be selected based on a defocusing operation in connection with a virtual focal point and at least one of: an azimuth or an elevation of the at least one beam, a random access channel (RACH) message from the at least one UE, a reference signal received power (RSRP) measurement of the at least one beam, or a width or a height of an enabled surface area of the node. The apparatus may transmit, to the at least one UE via the node, or receive, from the at least one UE via the node, communication via the at least one beam.

In an aspect of the disclosure, a method, a computer-readable medium, and an apparatus are provided. The apparatus may be a node. The apparatus may receive, from a base station, an indication to adjust a surface phase of the node corresponding to one or more beams toward the node or at least one of a plurality of beams from the node for communication with at least one UE. The one or more beams may correspond to the plurality of beams. The apparatus may send, via the at least one beam of the plurality of beams, communication from the base station to the at least one UE or communication from the at least one UE to the base station. The at least one beam may be based on a defocusing operation in connection with a virtual focal point and at least one of: an azimuth or an elevation of the at least one beam, a RACH message from the UE, an RSRP measurement of the at least one beam, or a width or a height of an enabled surface area of the node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
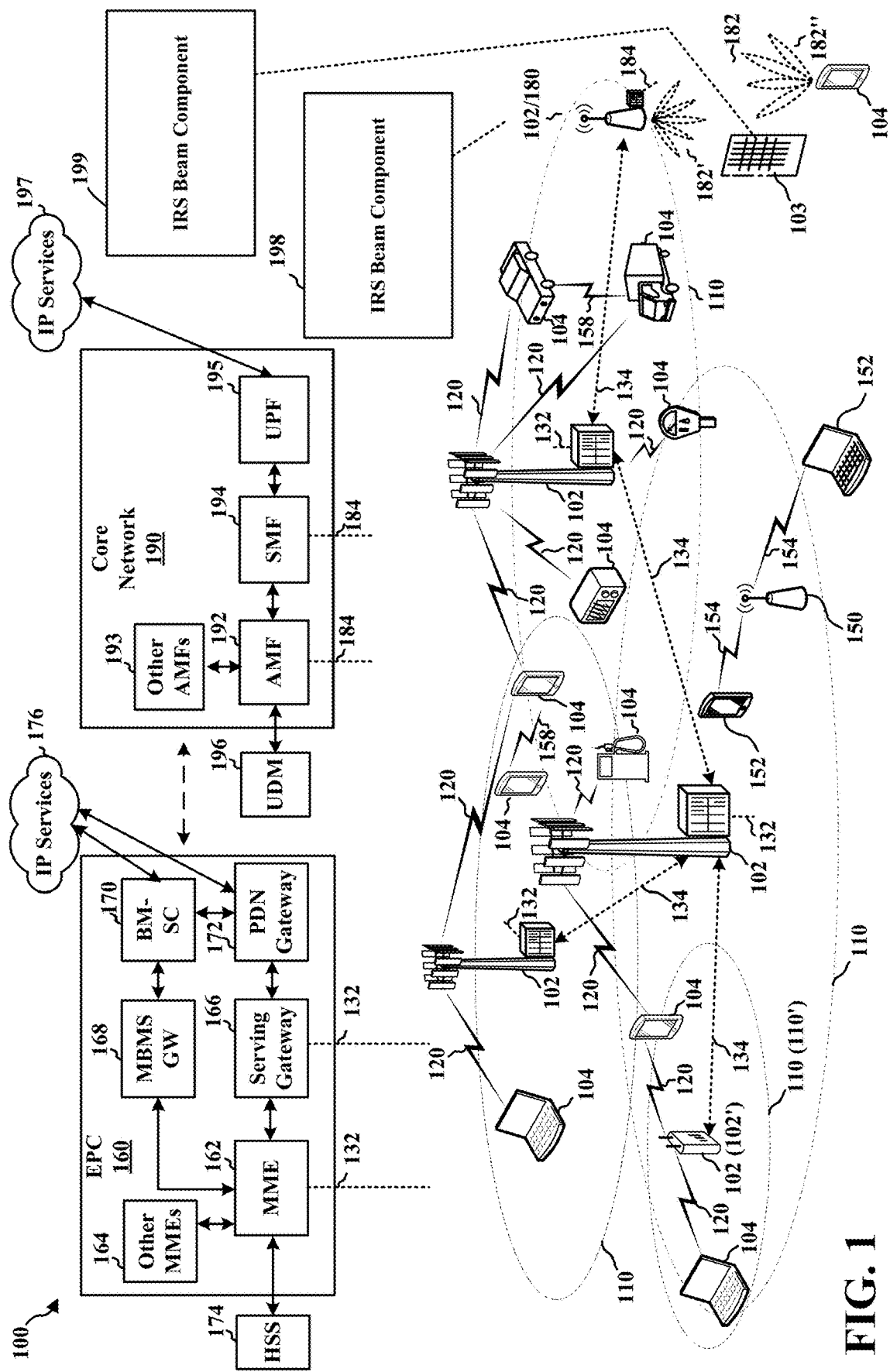
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station 180 may include an IRS beam component 198 that may be configured to identify one or more beams toward a node for communication with at least one UE. The one or more beams may correspond to a plurality of beams from the node. The IRS beam component 198 may transmit, to the node, an indication to adjust a surface phase of the node corresponding to the one or more beams or one of the plurality of beams from the node. The IRS beam component 198 may select at least one beam of the plurality of beams from the node for communication with the at least one UE. The at least one beam may be selected based on a defocusing operation in connection with a virtual focal point and at least one of: an azimuth or an elevation of the at least one beam, a random access channel (RACH) message from the at least one UE, a reference signal received power (RSRP) measurement of the at least one beam, or a width or a height of an enabled surface area of the node. The IRS beam component 198 may transmit, to the at least one UE via the node, or receive, from the at least one UE via the node, communication via the at least one beam. In certain aspects, the node 103 may include an IRS beam component 199 that may be configured to receive, from a base station, an indication to adjust a surface phase of the node corresponding to one or more beams toward the node or at least one of a plurality of beams from the node for communication with at least one UE. The one or more beams may correspond to the plurality of beams. The IRS beam component 199 may send, via the at least one beam of the plurality of beams, communication from the base station to the at least one UE or communication from the at least one UE to the base station. The at least one beam may be based on a defocusing operation in connection with a virtual focal point and at least one of: an azimuth or an elevation of the at least one beam, a RACH message from the UE, an RSRP measurement of the at least one beam, or a width or a height of an enabled surface area of the node. Although the following description may be focused on 5G NR, the concepts described herein may be applicable to other similar areas, such as LTE, LTE-A, CDMA, GSM, and other wireless technologies.

Figure 2:
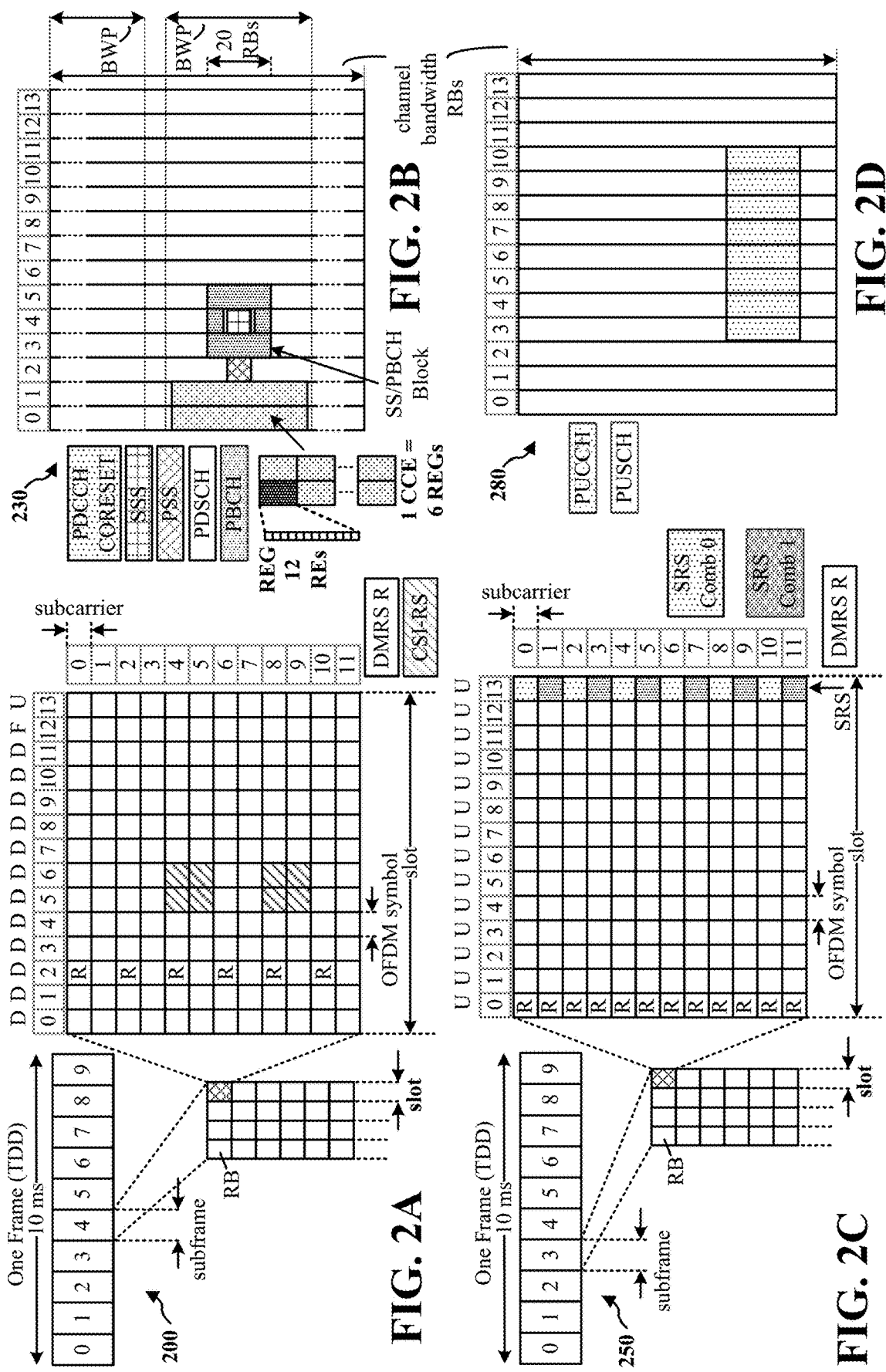
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu} \cdot 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
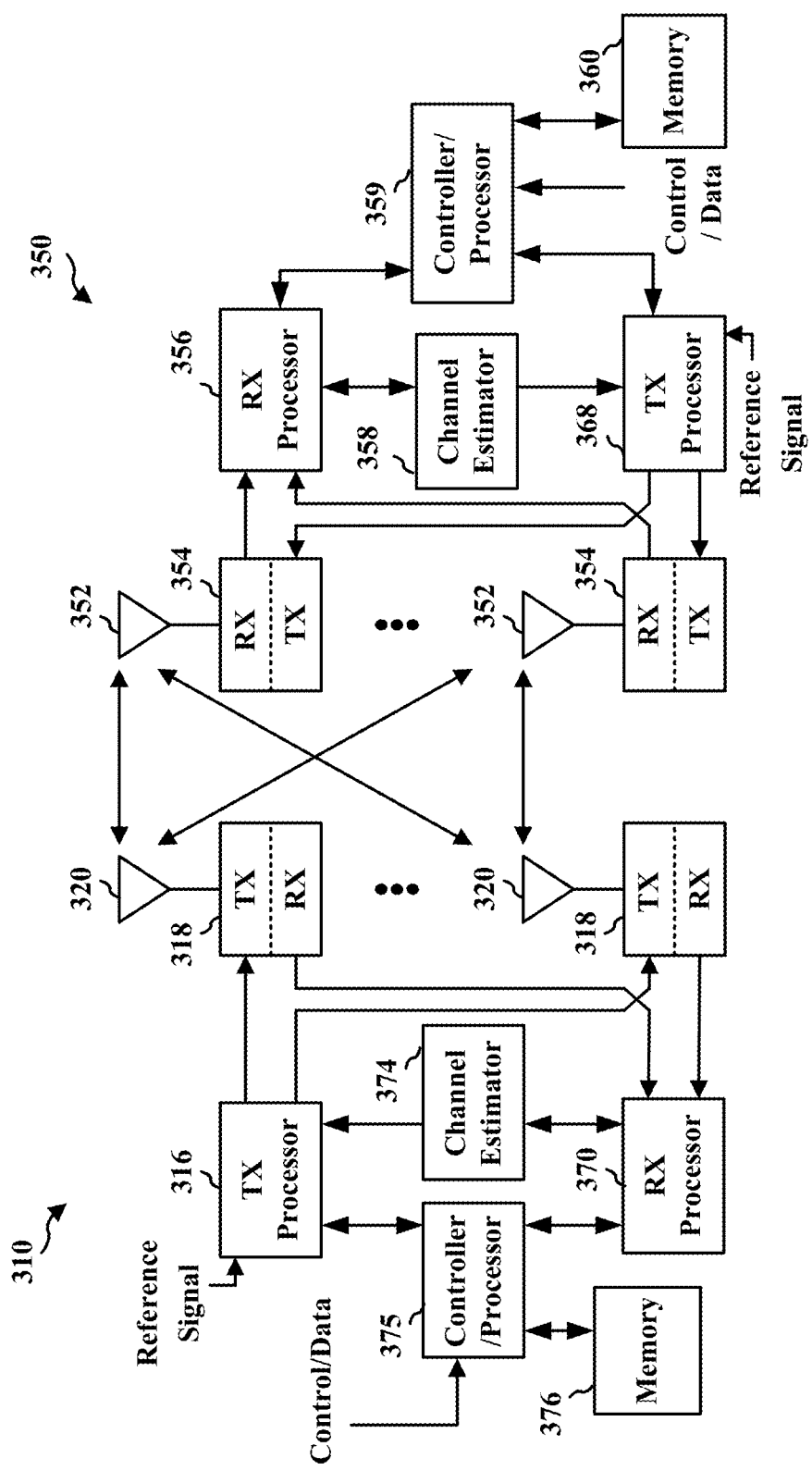
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 198 of FIG. 1.

Figure 4:
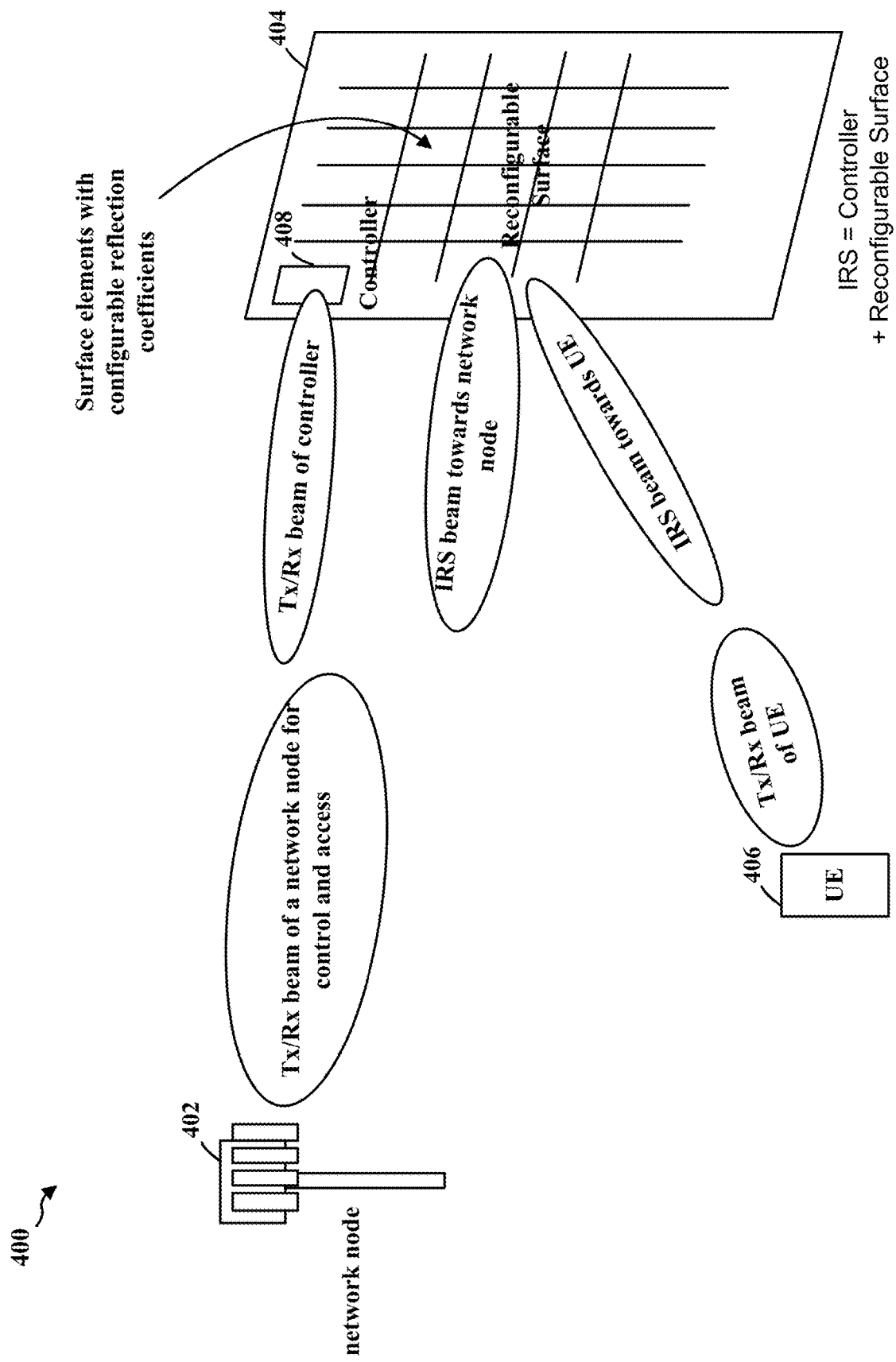
FIG. 4 is a diagram illustrating an environment in which aspects may be practiced.

FIG. 4 is a diagram 400 illustrating an environment in which aspects described herein may be practiced. An IRS 404 may include a surface with densely packed small surface elements. Each surface element may have a controllable reflection coefficient. By adjusting the reflection coefficient, the phase shift between the incident and reflected rays to and from the surface element, respectively, may be controlled. The IRS 404 may be controlled by the controller 408, which may be configured based on an IRS configuration message received from the network node 402. Depending on the implementation, various forms of non-ideal effects may take place. For example, the phase shift may have a limited range, or there may be a gain variation that depends on the phase shift. Depending on the implementation, the surface elements may also be referred to as metaatoms.

When the surface phase (that is, the phases of the surface elements) is properly set, the beam from the network node 402 may be reflected by the IRS 404 toward the UE 406 in downlink. Conversely, the beam from the UE 406 may be reflected by the IRS 404 toward the network node 402 in uplink. Accordingly, the IRS 404 may help to reduce the pathloss and avoid blockages in the line-of-sight (LOS) propagation. The network node 402 may be any of a base station, a remote radio head (RRH), a repeater, etc. Although herein aspects may be described in relation to 5G and millimeter wave (mmW) bands, the aspects may be equally applicable to other technologies such as 4G LTE, IEEE 802.11 WIFI, or future generations of technologies including beyond 5G, 6G, etc., and to other bands such as the sub-6 GHz bands, terahertz bands, etc.

One or more aspects described herein may relate to methods for initial acquisition and beam refinement using beams reflected from an IRS. During initial acquisition, the base station may perform a beam sweep of SSB beams. A beam sweep may include transmitting, sequentially, multiple beams associated with different configurations, so that the most suitable configuration may be identified. When an SSB beam falls onto an IRS, the IRS may reflect the incident SSB beam toward one or more UEs so that the UEs that are within the coverage area of the IRS may perform initial acquisition and a subsequent random access.

The reflected SSB beam from an IRS may be narrow, and UEs in the coverage area of the IRS may accordingly miss the SSB signals. This phenomenon may be especially pronounced at high bands.

In one aspect, the surface phase of an IRS may be set so that the reflected beam from the IRS may cover a wide area, thus enabling the UEs in the coverage area of the IRS to detect the SSB beam, and also to perform random access. In some aspects, the beam squint may be nonexistent or negligible. Therefore, a wide area of the IRS may be enabled for reflecting the SSB beams, providing an appreciable energy gain (e.g., a link budget improvement).

In one aspect, an initial acquisition procedure may be performed based on a defocusing method. In one aspect, a beam refinement procedure may be performed based on the defocusing method. In one aspect, the beam refinement procedure may be further based on a beam that is focused at infinity. In some aspects, the beam refinement procedure may be based on a CSI-RS or an SRS instead of an SSB beam.

For initial acquisition, before transmitting an SSB signal through one of the base station beams, the base station may transmit a control signal to the IRS (in particular, the controller of the IRS) in the coverage area of the base station beam. Based on the control signal received from the base station, the IRS may form a wide beam. A wide beam may be associated with an angular spread that is greater than a threshold. For example, the IRS may form the wide beam based on a defocusing procedure, which will be described in further detail below. The wide beam may also be formed based on other methods (e.g., the least-squares method).

In some aspects, during initial acquisition, the IRS may perform a beam sweep of SSB beams within the coverage area of the IRS with multiple wide beams, in order to identify the most suitable wide beam. The base station may repeat the SSB beam while commanding the IRS to sweep over the wide beams. One or more UEs may perform the random access procedure based on a detected SSB. The UE may receive the detected SSB from the IRS via a wide beam.

Subsequent to initial acquisition, a beam refinement procedure may be performed at an IRS in relation to a UE. A refined beam from the IRS may be a narrower beam (than the SSB wide beam) that is more suitable for the communication with the UE.

In one aspect, the beam refinement procedure may be performed based on wide beams of gradually reduced angular spread. The most suitable candidate refined beam may be selected based on RSRP measurements from the UE. The RSRP measurements may be based on SSBs, CSI-RSs, or SRSs. In one aspect, based on a control signal received from the base station, the IRS may form beams focused at infinity for more refined beam detection.

In one aspect, the base station may use a channel estimation method to identify a radial distance of the UE from the IRS. Accordingly, the IRS may form beams focused on the UE (e.g., through beam forming based on the radial distance of the UE in addition to the azimuth and the elevation of the UE).

The wide SSB beam for initial acquisition may benefit one UE or more than one UEs at once. All UEs within the coverage area of the wide beam may benefit from the wide beam. The beam refinement procedure including the use of narrower wide beams (e.g., based on SSBs, CSI-RSs, or SRSs) may benefit one UE or more than one UEs at once.

One or more aspects described herein may be fully backward compatible with earlier UEs. The aspects described herein may be associated with no or negligible beam squint. Therefore, a large IRS area may be enabled for an appreciable energy gain.

During initial acquisition, the SSB beams reflected from the IRS may be common to all UEs within the coverage area of the IRS. In one aspect, the wide beams may be formed based on the defocusing procedure, as will be described in further detail below. Based on the beam sweep and RSRP measurements, the most suitable wide SSB beam may be selected. For example, based on the RSRP measurements, a UE may identify and select the most suitable wide SSB beam, and may transmit an indication of the selected most suitable wide SSB beam through an uplink transmission to the base station via the IRS. Based on the UE selection, the base station may transmit a control signal to the IRS (in particular, the controller of the IRS) to instruct the IRS to use the wide SSB beam selected by the UE. In different examples, a wide beam may be associated with an angular spread of 30 degrees, 60 degrees, etc.

The beam refinement procedure may be performed in relation to one UE, or may be common to multiple UEs. The beam refinement procedure may include an iterative process, where with each successive iteration, beams with gradually narrowed angular spreads may be swept and tested in order to identify the most suitable beam within each iteration. The angular spread of the most suitable beam identified in one iteration may be the angular range within which the even narrower candidate beams are swept and tested in the subsequent iteration.

In one example, four iterations may be performed in the beam refinement procedure. The angular spread of the candidate beams in each successive iteration may be, respectively, 30 degrees, 15 degrees, 7.5 degrees, and 3 degrees. In another example, three iterations may be performed in the beam refinement procedure. The angular spread of the candidate beams in each successive iteration may be, respectively, 60 degrees, 15 degrees, and 4 degrees.

In one aspect, beams focused at infinity based on the most suitable beam identified through the iterative process may be further tested in the beam refinement procedure. A beam focused at infinity may be a narrow beam. Focusing a beam at infinity is described in further detail below. Based on the beam refinement procedure, the approximate azimuth and elevation of the UE may be detected. However, the radial distance or the phase alignment of the UE may not be detected based on the beam refinement procedure.

In one aspect, the IRS may form a beam focused on a UE. In other words, the beam may be specific to the UE. To form a beam focused on a UE, a radial distance of the UE from the IRS may be identified based on a channel estimation method. The channel estimation method may be used to further refine the beam for a UE, and/or to estimate the radial distance of the UE or the phase offset to the UE.

The procedures of initial acquisition and beam refinement may be further explained based on one example. For initial acquisition, a 60-degree wide beam from an IRS (e.g., formed using the defocusing procedure) may be used. The beam may be defocused in azimuth, but focused at infinity in elevation for a better path gain (i.e., a reduced pathloss). This may be achieved due to the fact that the signal energy being spread over an undesired dimension (e.g., elevation, in this example) may be avoided.

Once the UE detects the 60-degree wide SSB beam, the beam refinement procedure may start. The 60-degree wide beam may be the starting candidate beam. In the subsequent iteration, the IRS may form, sequentially in time, and sweep four 15-degree wide beams associated with non-overlapping angular ranges to cover the angular range of the 60-degree wide beam.

Based on RSRP measurements (which may be based on SSBs, CSI-RSs, or SRSs), the most suitable of the four 15-degree beams may be selected for each UE. So far, the operations may be common to multiple UEs, thus, extra overhead may be avoided.

The most suitable of the four 15-degree beams may be further divided, in the subsequent iteration, into four narrower still beams. The narrower beams may also be formed based on the defocusing procedure. In this iteration, the most suitable candidate beam may again be identified and selected for a UE based on RSRP measurements (e.g., based on SSBs, CSI-RSs, or SRSs).

Based on one or more aspects described herein, the beam squint (that is, frequency domain selectivity by frequency offset) may be nonexistent or negligible. Accordingly, a large area of the IRS may be enabled and used for an appreciable energy gain.

Figure 5:
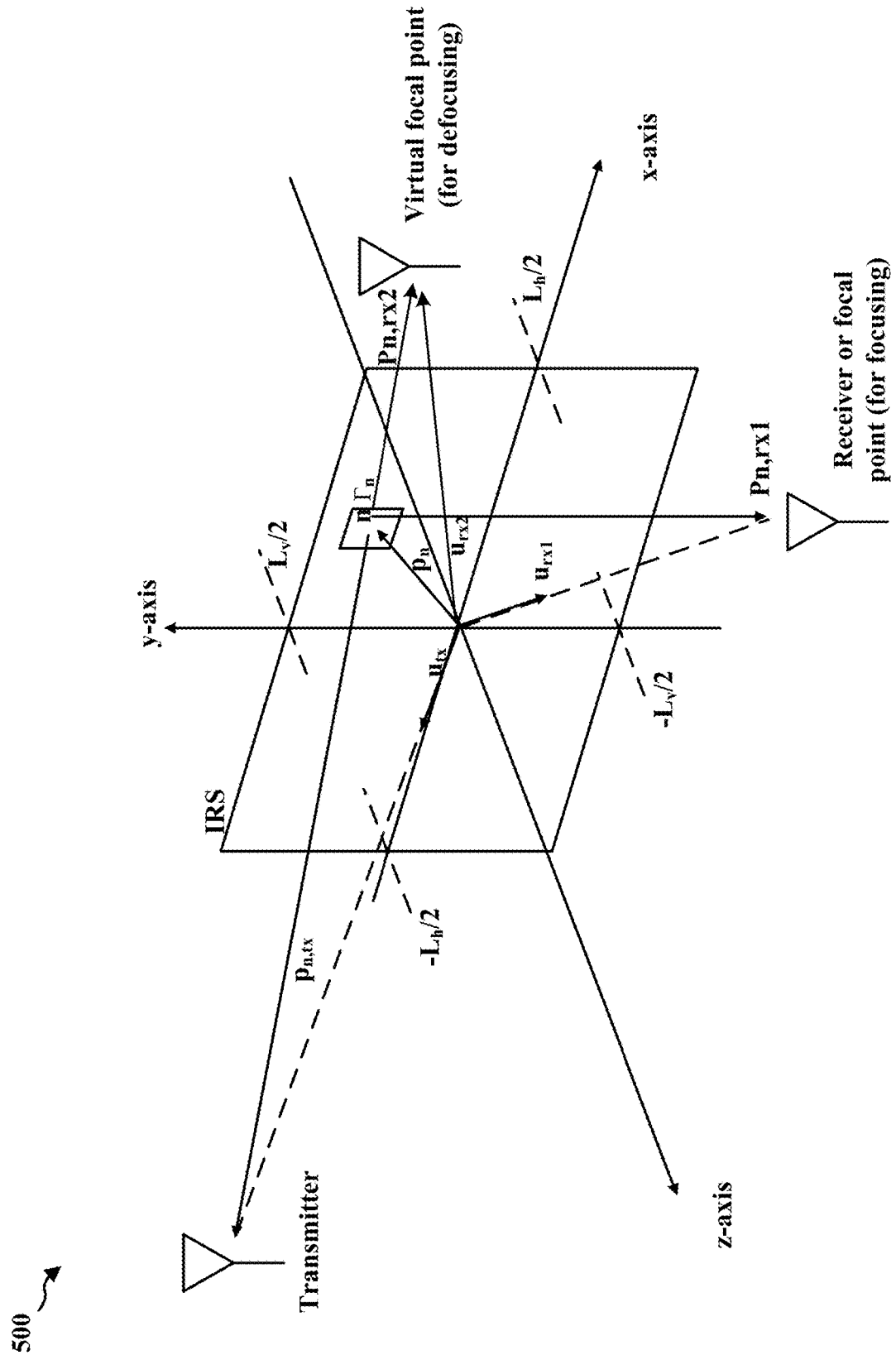
FIG. 5 is a diagram illustrating various parameters involved in the focusing and defocusing operations of an IRS.

FIG. 5 is a diagram 500 illustrating various parameters involved in the focusing and defocusing operation of an IRS. An IRS (e.g., the IRS 404) may implement a focusing operation to beamform toward a UE (e.g., the UE 406), where the phases of received rays may align. Unlike open-loop beamforming, focusing may take into account the radial distance of the UE from the IRS, in addition to the azimuth and the elevation of the UE. Focusing may be achieved by setting the surface phase of the IRS in a particular way.

As illustrated, $p_{n,tx}$ may be a vector from the surface element n to the Tx point. $p_{n,rx1}$ may be a vector from the surface element n to the Rx point. $p_{n,rx2}$ may be a vector from the surface element n to the virtual Rx point. $p_n$ may be a vector from the origin to the surface element n. $u_{tx}$ may be a unit-vector from the origin to the Tx point. $u_{rx1}$ may be a unit-vector from the origin to the Rx point. $u_{rx2}$ may be a unit-vector from the origin to the virtual Rx point. $\Gamma_n$ may be the reflection coefficient at the surface element n.

To focus from the Tx point tx to the Rx point rx1, $\Gamma_n = \exp(j2\pi(d_{n,tx} + d_{n,rx})/\lambda)$, where $d_{n,tx} = |p_{n,tx}|$ and $d_{n,rx} = |p_{n,rx1}|$, and $\lambda$ is the operating wavelength.

To focus at infinity (which may form a narrow beam), $\Gamma_n$ may be factorized as: $\Gamma_n = \Gamma^{tx}_n \Gamma^{rx}_n$, where $\Gamma^{tx}_n = \exp(j2\pi d_{n,tx}/\lambda)$ and $\Gamma^{rx}_n = \exp(j2\pi d_{n,rx1}/\lambda)$. The calculations may be used for either or both of $\Gamma^{tx}_n$ and $\Gamma^{rx}_n$. On the transmitter side, $d_{n,tx} = -\langle p_n, u_{tx} \rangle$. On the receiver side (which applies to the real focal point "rx1"), $d_{n,rx} = -\langle p_n, u_{rx1} \rangle$.

Defocusing may apply mainly to the Rx side (e.g., the downlink). To defocus, the negative of the distance from surface element n to virtual focal point rx2 may be used: $d_{n,rx} = -|p_{n,rx2}|$. With the wide beam formed using defocusing, it may be as if the signals have been transmitted by a transmitter located at the virtual focal point. In one aspect, an IRS may defocus on the azimuthal plane, but may focus at infinity in elevation. This may be achieved by ignoring the y-component when computing $d_{n,rx}$. The width (e.g., the angular spread) of a defocused wide beam may be adjusted by adjusting the radial distance of the virtual focal point to the IRS. The direction of a defocused wide beam may be adjusted by adjusting the horizontal and/or vertical positions of the virtual focal point relative to the IRS.

Focusing and defocusing may be used in combination. In one example, the IRS may focus (at a finite point or at infinity) on rx (or tx), and may defocus on tx (or rx). In another example, the IRS may focus (at a finite point or at infinity) in azimuth (or elevation), and may defocus in the other dimension (i.e., elevation (or azimuth), respectively).

Figure 6:
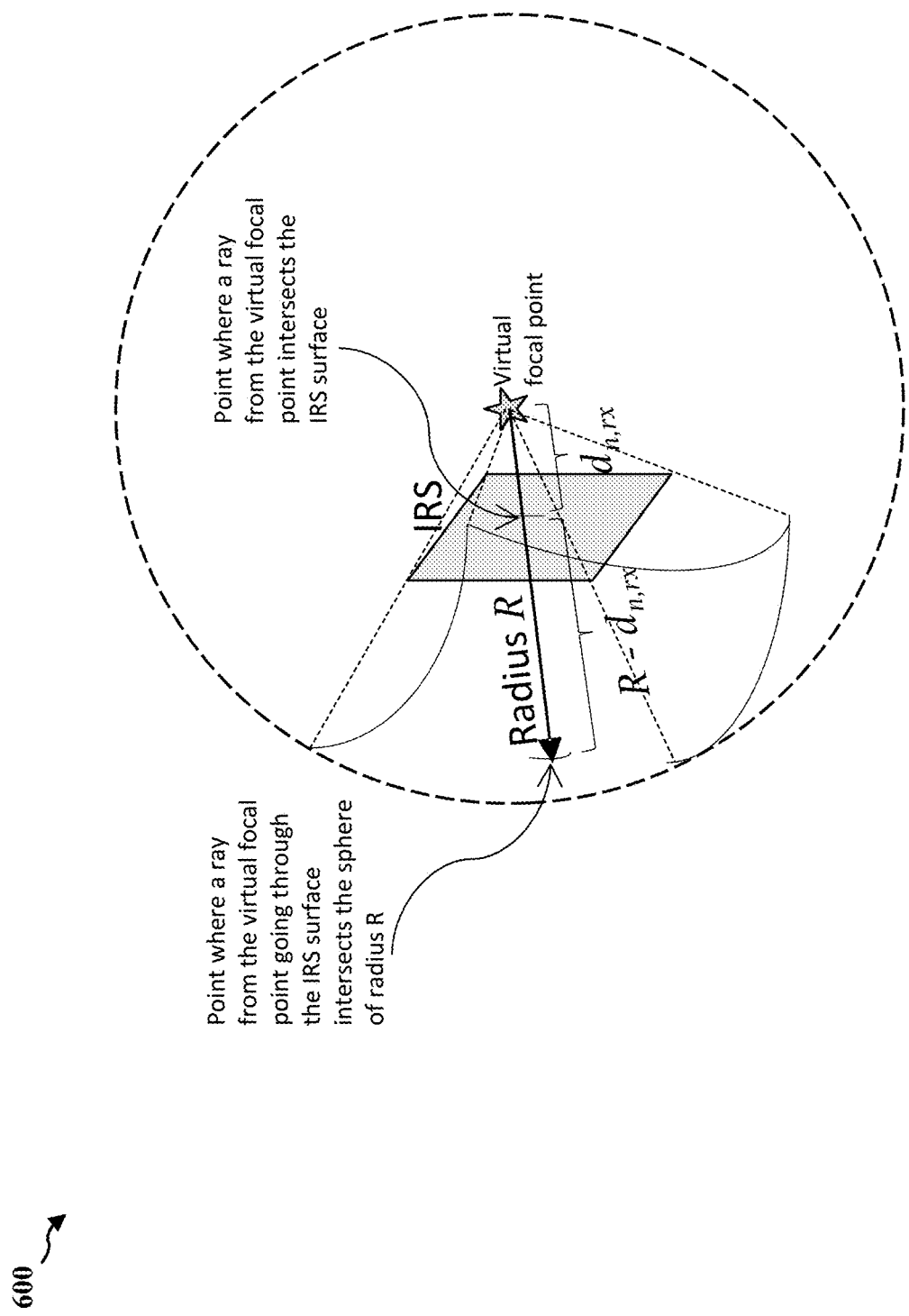
FIG. 6 is an example diagram illustrating defocusing in both azimuth and elevation.

FIG. 6 is an example diagram 600 illustrating defocusing in both azimuth and elevation. Defocusing in azimuth and elevation may be equivalent to reflecting incident rays so that the phase front of the reflected beam forms a sphere around the virtual focal point. The energy may dissipate quickly as the distance increases because the energy is dissipated in three dimensions. More generally, the phase front may be an ellipsoid. Defocusing in both azimuth and elevation may be accomplished by setting the IRS surface reflection coefficient as: $\Gamma n = \exp(j2\pi(d_{n,tx} + (R - d_{n,rx}))/\lambda)$. It should be appreciated that because the presence of the arbitrarily chosen radius R adds an arbitrary constant phase offset (which does not affect the desired result), the radius R may be dropped. Hence, the IRS surface reflection coefficient may be given by: $\Gamma_n = \exp(j2\pi(d_{n,tx} - d_{n,rx})/\lambda)$.

Figure 7:
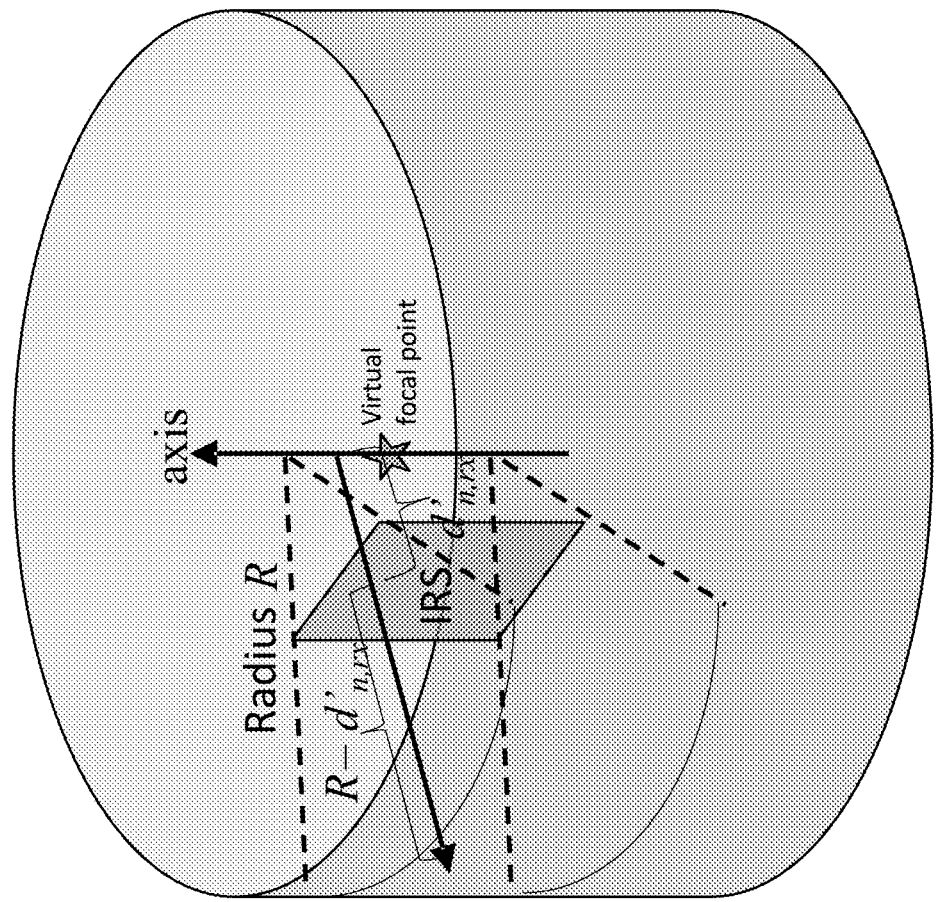
FIG. 7 is an example diagram illustrating defocusing in azimuth while focusing at infinity in elevation.

FIG. 7 is an example diagram 700 illustrating defocusing in azimuth while focusing at infinity in elevation. Defocusing in azimuth, while focusing at infinity in elevation, may be equivalent to reflecting incident rays so that phase front of the reflected beam forms a cylindrical surface around the virtual focal point. The energy may dissipate less quickly as the distance increases because the energy is dissipated in two dimensions. Defocusing in azimuth while focusing at infinity in elevation may be accomplished by setting the IRS surface reflection coefficient as: $\Gamma_n = \exp(j2\pi(d_{n,tx} + (R - d'_{n,rx}))/\lambda)$, where d'n,rx may be the "horizontal" distance from the virtual focal point to the IRS element n. Equivalently, it may be the distance obtained by ignoring the component in y-axis. It should be appreciated that because the presence of the arbitrarily chosen radius R adds an arbitrary constant phase offset (which does not affect the desired result), the radius R may be dropped. Hence, the IRS surface reflection coefficient may be given by: $\Gamma_n = \exp(j2\pi (d_{n,tx} - d'_{n,rx})/\lambda)$. The concept may be further generalized to defocusing in azimuth while focusing at a finite point (instead of infinity) in elevation or, alternatively, also defocusing in elevation, but with a different angular spread. This may be accomplished by suitably modifying the computation of $d'_{n,rx}$ based on the desired wavefront. It should be noted that FIGS. 6 and 7 illustrate examples based on the assumption that the defocused beams are pointing towards zero azimuth and elevation, which may not apply in some other aspects. Beams may be turned towards other azimuths and/or elevations by moving the virtual focal point to non-central locations.

Figure 8:
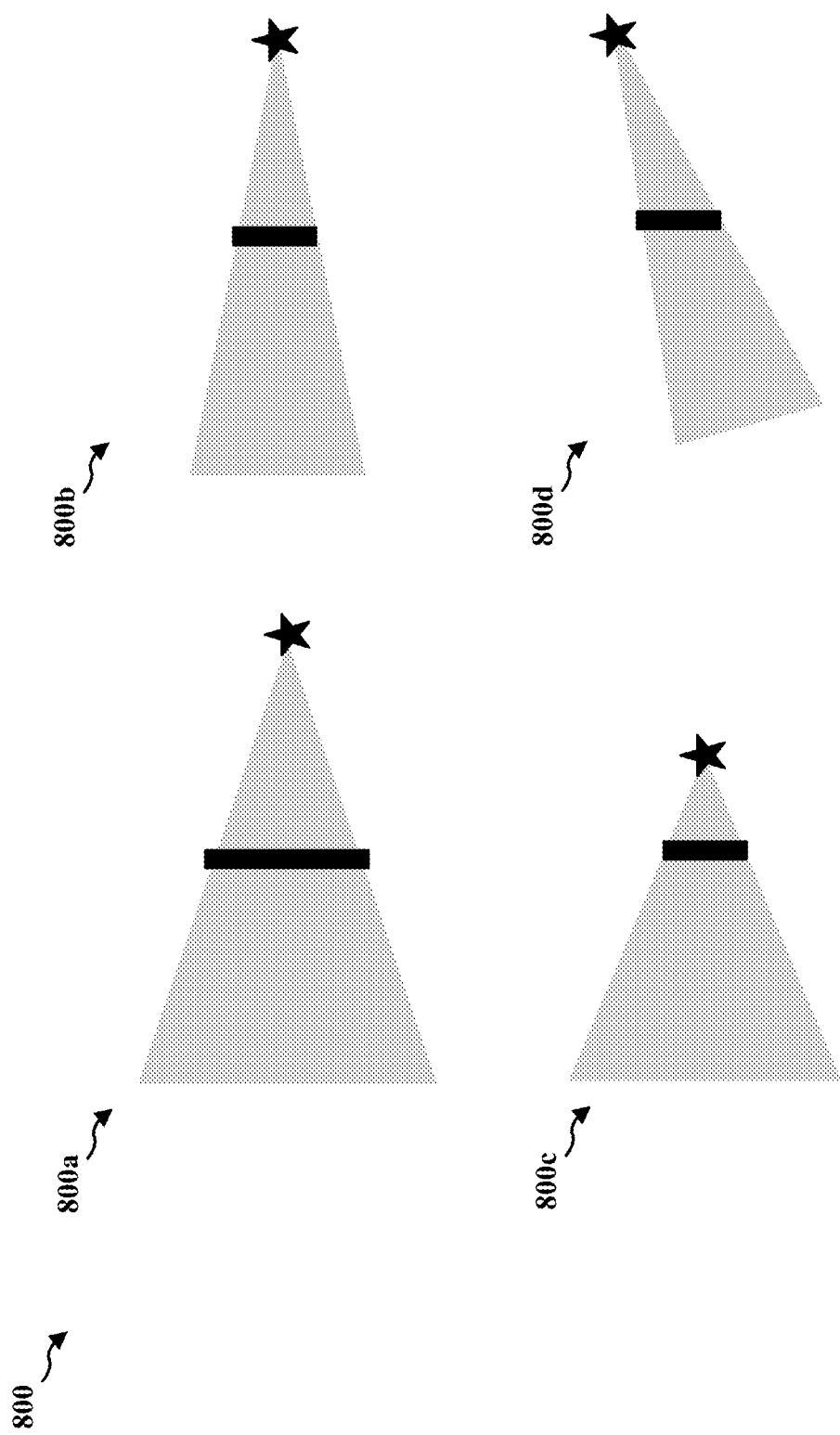
FIG. 8 is a diagram illustrating the controlling of the beam width and the beam direction in connection with a node.

FIG. 8 is a diagram 800 illustrating the controlling of the beam width and the beam direction in connection with a node. The beam width and the direction may be controlled based on the controlling of the active node (IRS) area and the position of the virtual focal point. In FIG. 8, for purposes of illustration, the radio waves may be represented as if emanating from the virtual focal point (indicated with a star): Only the portion of the illumination that is in front of the node (IRS) (i.e., to the left of the node in FIG. 8) may be present. FIG. 8 may be interpreted as views of the node setup from above, where the shown beam widths and directions may apply to the azimuthal plane. FIG. 8 may also be interpreted as view of the node from the side, where beam widths and directions may be in elevation. Diagram 800a illustrates a wide beam with a direction of zero degrees of azimuth (or elevation). Diagram 800b shows how the beam may be narrowed by reducing the size or the active area of the node while keeping the distance of the virtual focal point unchanged. Diagram 800c shows how a beam of the same width as that in diagram 800a may be obtained by a smaller node by moving the virtual focal point closer to the node. Diagram 800d shows how the direction of the beam may be controlled by changing the azimuth and/or the elevation of the virtual focal point. These concepts may apply to both the spherical and the cylindrical wavefronts described herein. In particular, FIG. 6 described above may relate to a spherical wavefront. FIG. 7 described above may related to a cylindrical wavefront.

Figure 9:
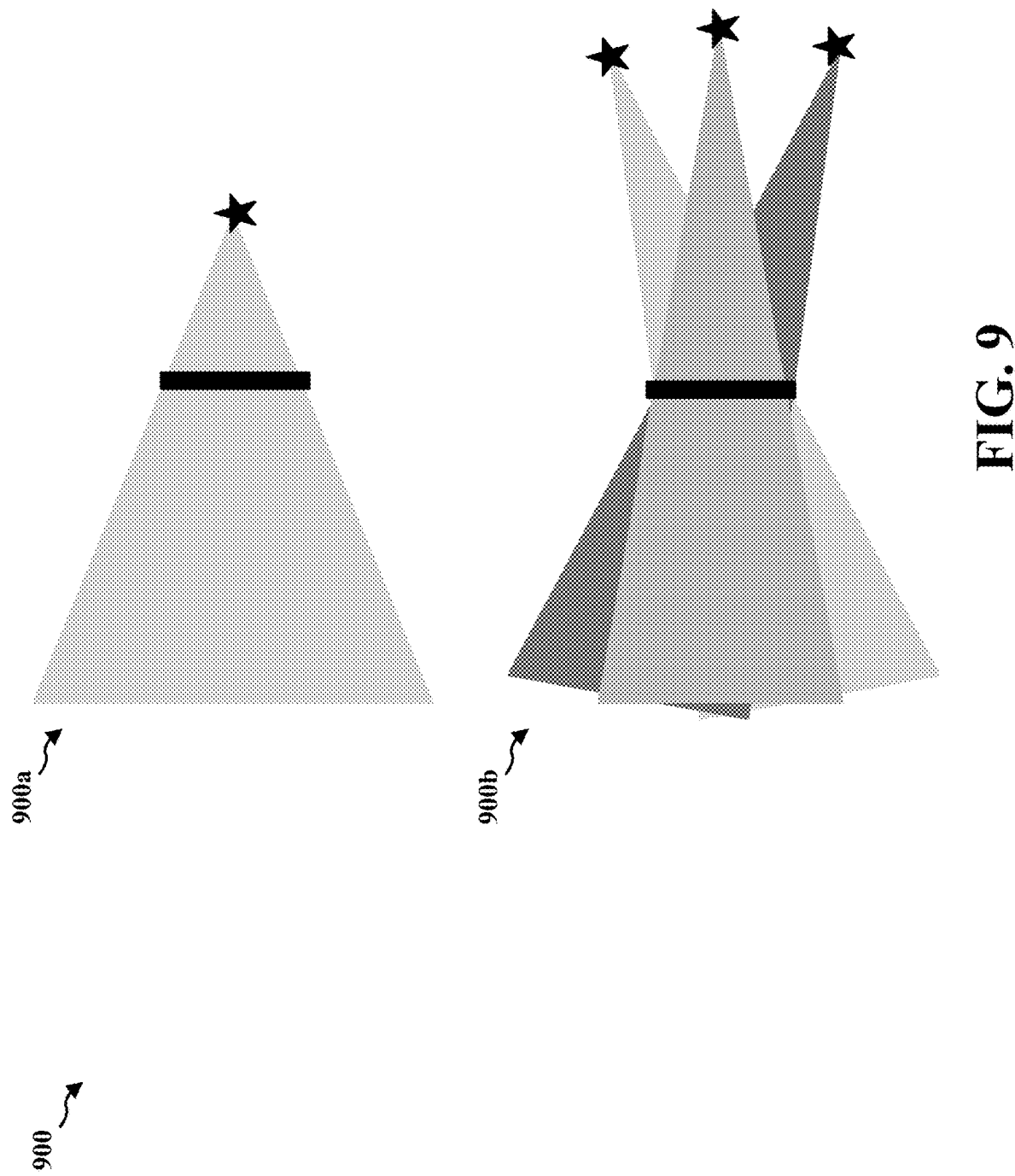
FIG. 9 is a diagram illustrating beam configurations for the initial acquisition and the beam refinement procedures in connection with a node.

FIG. 9 is a diagram 900 illustrating beam configurations for the initial acquisition and the beam refinement procedures in connection with a node. Beamforming for initial acquisition and for beam refinement through a reflected beam from a node (IRS) may be performed by using defocused beams based on virtual focal point configurations. FIG. 9 may be interpreted as views of a node from above. Diagram 900a shows an initial wide beam through which a base station may transmit an SSB. Diagram 900b shows three narrower beams that may be formed in succession. Each narrower beam may be formed by moving the virtual focal point farther away from the node. The direction of each narrower beam may be set by suitably setting the azimuthal angle of the virtual focal point. The set of narrower beams may be chosen to cover the same area as the wide beam shown in diagram 900a. In the setup of diagram 900a, the UE may use an SSB signal to measure the signal strength. In the setup of diagram 900b, the UE may use CSI-RS or SSB beams to measure the RSRP or other channel quality metrics to select the strongest beam. The process may continue by further refining the beams. These procedures may be similar to the P1/P2 procedures used for direct links between the base station and the UE. FIG. 9 shows reflected beams from a node (IRS). Although FIG. 9 is shown in the context of setting the beam width and the beam direction in the azimuthal plane, the same concepts may apply to the elevation plane as well.

Figure 10:
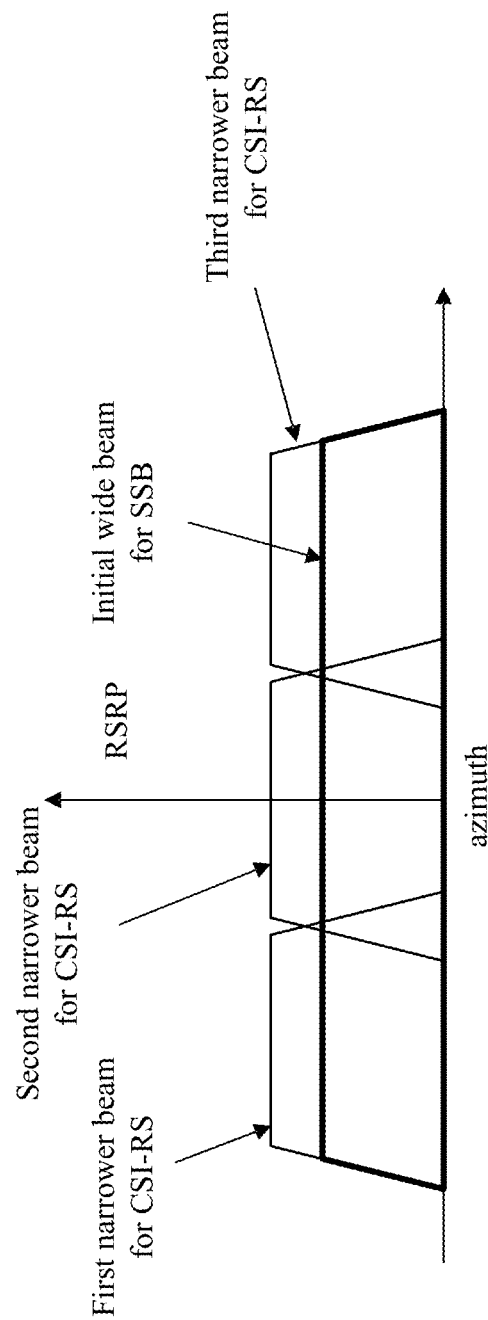
FIG. 10 is a diagram illustrating plots of the RSRP as a function of azimuthal angles in connection with beams at a node.

FIG. 10 is a diagram 1000 illustrating plots of the RSRP as a function of azimuthal angles in connection with beams at a node. FIG. 10 illustrates RSRPs versus azimuthal angles for the SSB beam for initial acquisition and for the subsequent narrower CSI-RS beams for beam refinement. The narrower beams may be stronger (e.g., associated with a higher RSRP) as the energy is concentrated in a narrower angular range. The procedure may be similar to the P1/P2 procedures. The beams may be produced based on the defocusing procedure described herein.

Figure 11:
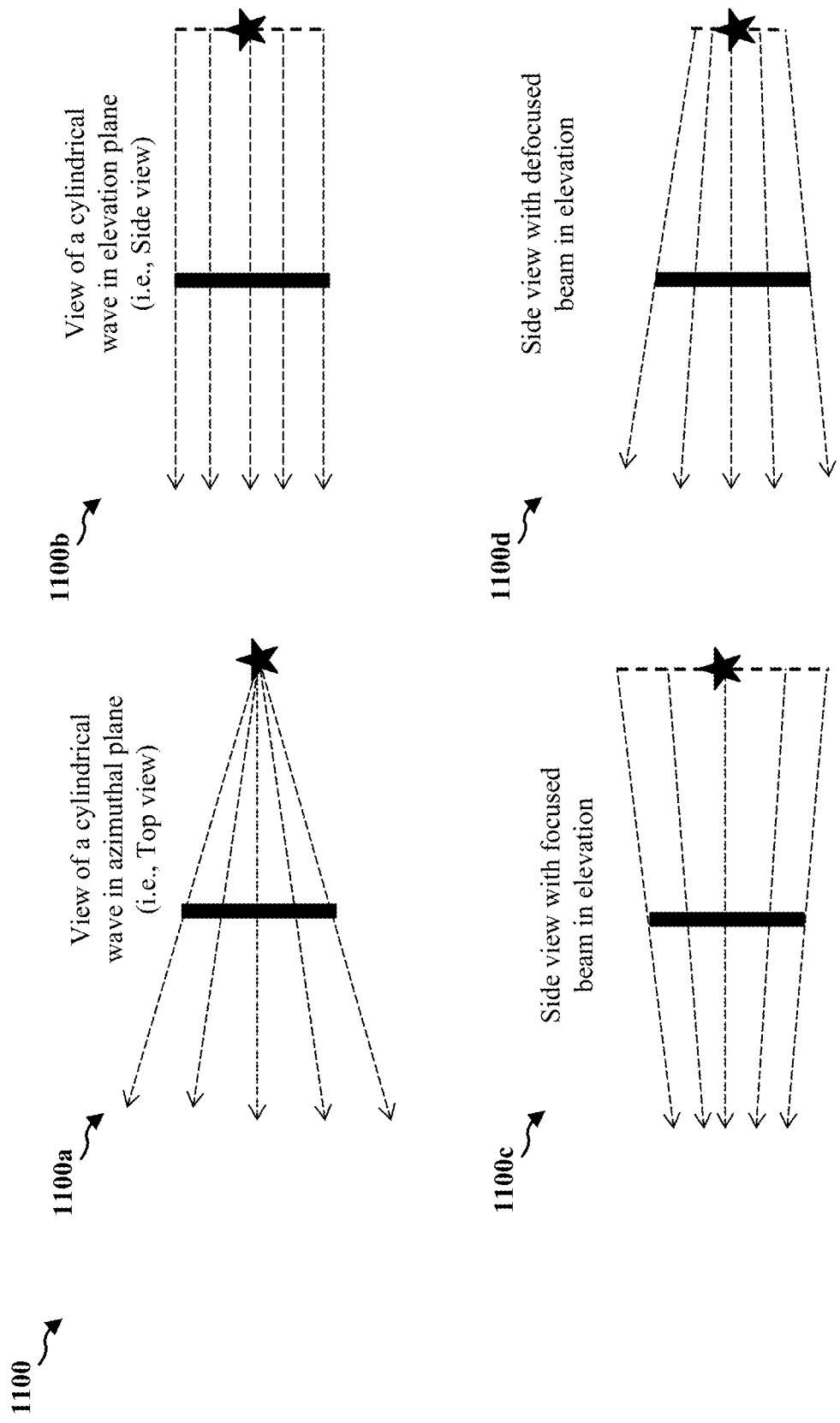
FIG. 11 is a diagram illustrating variations of the generation of cylindrical wavefronts in connection with a node.

FIG. 11 is a diagram 1100 illustrating variations of the generation of cylindrical wavefronts in connection with a node. FIG. 7 above is related to the cylindrical wavefront generation based on the use of the virtual focal point. FIG. 11 shows further variations to the generation of cylindrical wavefronts. Diagrams 1100a and 1100b show additional views of the node shown in FIG. 7. Diagram 1100a shows the top view where the beam may be wide in the azimuthal plane. Diagram 1100b shows the elevation plane where the vertical axis may be ignored in distance calculations. Diagrams 1100c and 1100d show further possibilities. In particular, diagram 1100c shows focusing in the elevation plane by scaling the vertical axis in the distance computation as part of the reflection coefficient calculation, and diagram 1100c shows defocusing in the elevation plane by scaling the vertical axis in a same or similar fashion. More specifically, in cases illustrated in the diagram 1100c or the diagram 1100d, the surface phase at a given surface element may be obtained by using the length of the ray from that surface element to the wavefront, where the wavefront may be defined by rotating an arc (i.e., a segment of a circle) around the vertical axis that goes through the virtual focal point. The arc that is rotated may be chosen to be perpendicular to the rays shown in the diagrams 1100c and 1100d.

Figure 12:
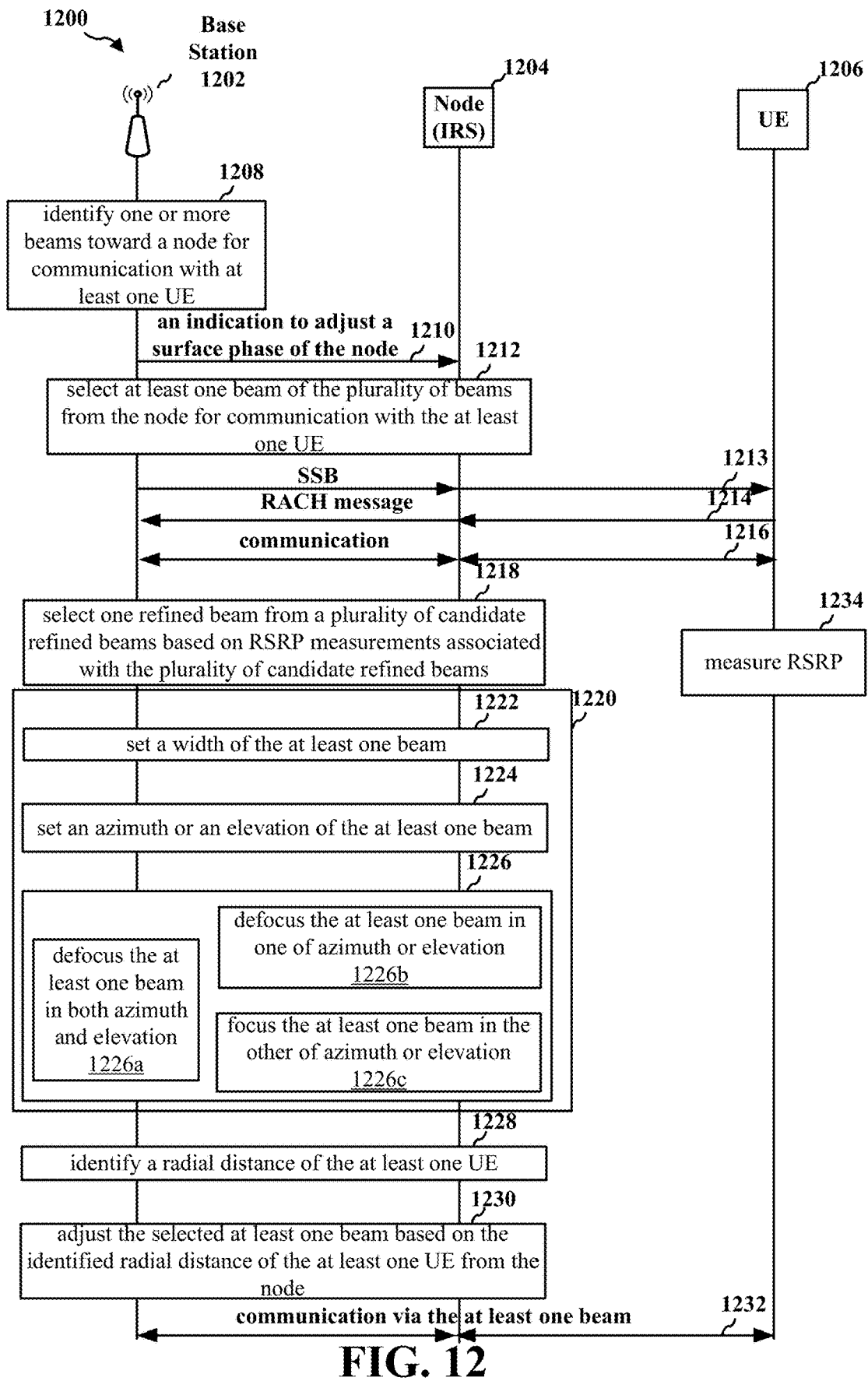
FIG. 12 is a diagram of a communication flow of a method of wireless communication.

FIG. 12 is a diagram of a communication flow 1200 of a method of wireless communication. The base station 1202 may correspond to the base station 102/180/310. The node (IRS) 1204 may correspond to the node/IRS 103/404. The UE 1206 may correspond to the UE 104/350. At 1208, the base station 1202 may identify one or more beams toward a node 1204 for communication with at least one UE 1206. At 1210, the base station 1202 may transmit, to the node 1204, and the node 1204 may receive, from a base station 1202, an indication to adjust a surface phase of the node 1204 corresponding to the one or more beams or one of the plurality of beams from the node 1204. At 1212, the base station 1202 may select at least one beam of the plurality of beams from the node 1204 for communication with the at least one UE 1206. 1212 may correspond to either a beam sweep in an initial acquisition procedure, or may correspond to a beam refinement procedure. At 1213, the base station 1202 may transmit to the UE 1206, one or more SSBs via the node 1204. At 1214, the base station 1202 may receive, from the at least one UE 1206 via the node 1204, and the node 1204 may send, from the at least one UE 1206 to the base station 1202, the RACH message for random access. The RACH message may be based on the SSB detected by the UE 1206 at 1213. At 1216, the node 1204 may reflect or forward the communication from the base station 1202 to the at least one UE 1206 or the communication from the at least one UE 1206 to the base station 1202.

At 1218, the base station 1202 may select one refined beam from a plurality of candidate refined beams based on RSRP measurements associated with the plurality of candidate refined beams. At 1220, the base station 1202 may configure the node 1204 to perform the defocusing operation based on the indication to adjust the surface phase of the node 1204. At 1222, the base station 1202 or the node 1204 may set a width of the at least one beam based on at least one of a radial distance of the virtual focal point from the node 1204 or the width of the enabled surface area of the node 1204. At 1224, the base station 1202 or the node 1204 may set an azimuth or an elevation of the at least one beam based on an azimuth or an elevation of the virtual focal point. At 1226a, the base station 1202 may configure the node 1204 to defocus the at least one beam in both azimuth and elevation. The node 1204 may defocus the at least one beam in both azimuth and elevation. In one configuration, the at least one beam may be defocused in one of azimuth or elevation with a particular angular spread, and may be defocused in the other of azimuth or elevation with a different angular spread.

At 1226b, the base station 1202 may configure the node 1204 to defocus the at least one beam in one of azimuth or elevation. The node 1204 may defocus the at least one beam in one of azimuth or elevation. At 1226c, the base station 1202 may configure the node 1204 to focus the at least one beam in the other of azimuth or elevation. The node 1204 may focus the at least one beam in the other of azimuth or elevation.

At 1228, the base station 1202 may identify, via the selected at least one beam of the plurality of beams from the node 1204, a radial distance of the at least one UE 1206 from the node 1204 based on a channel estimation procedure. At 1230, the base station 1202 may configure the node 1204 to adjust the selected at least one beam based on the identified radial distance of the at least one UE 1206 from the node 1204. At 1232, the base station 1202 may transmit, to the at least one UE 1206 via the node 1204, or receive, from the at least one UE 1206 via the node 1204, communication via the at least one beam. The node 1204 may send, via the at least one beam of the plurality of beams, communication from the base station 1202 to the at least one UE 1206 or communication from the at least one UE 1206 to the base station 1202. At 1234, the UE 1206 may measure the RSRP based on at least one of SSBs, CSI-RSs, or SRSs. The RSRP measurements may be used in at least one of the initial acquisition procedure or the beam refinement procedure.

Figure 13:
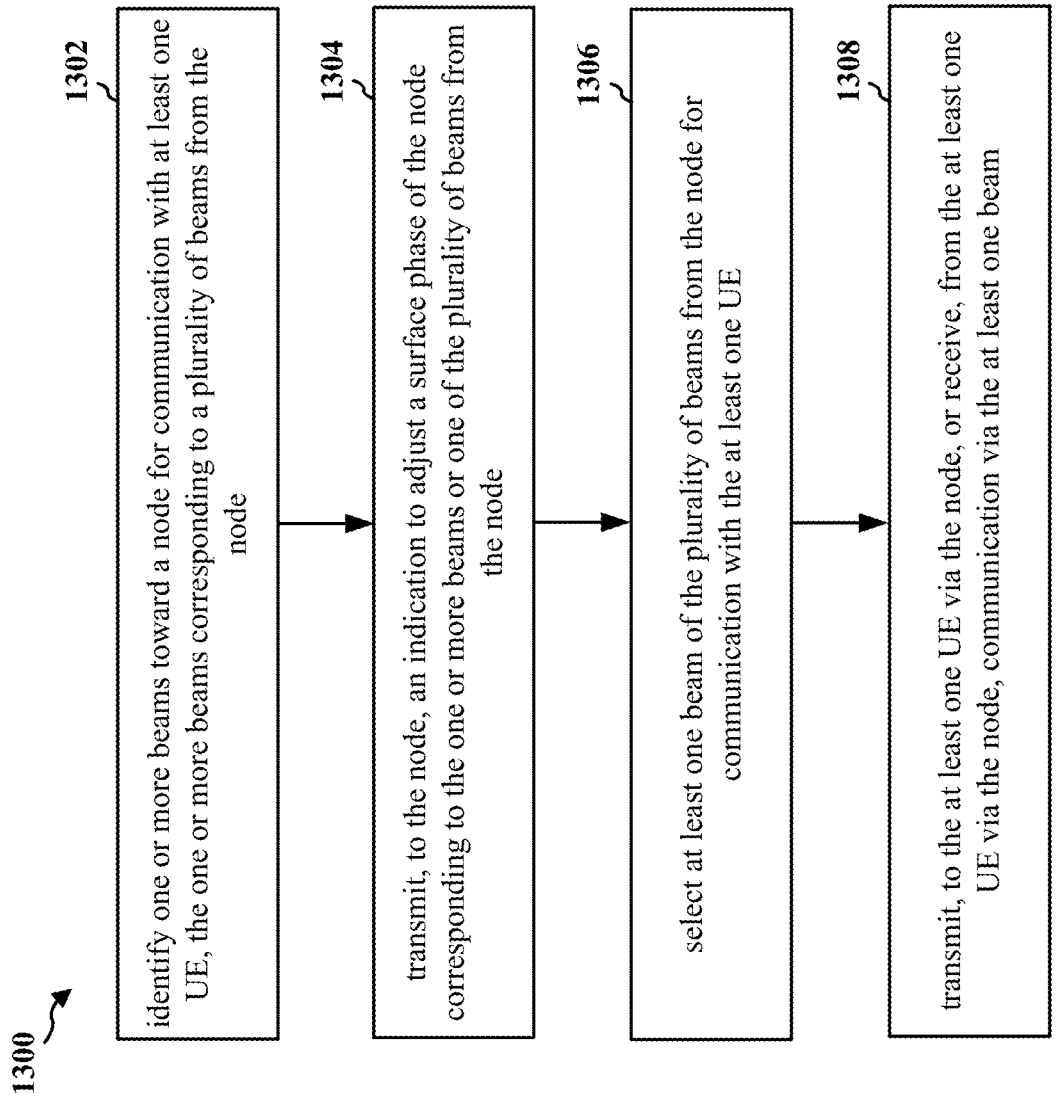
FIG. 13 is a flowchart of a method of wireless communication.

FIG. 13 is a flowchart 1300 of a method of wireless communication. The method may be performed by a base station (e.g., the base station 102/180/310/1202; the apparatus 1702). At 1302, the base station may identify one or more beams toward a node for communication with at least one UE. The one or more beams may correspond to a plurality of beams from the node. For example, 1302 may be performed by the IRS beam component 1740 in FIG. 17. Referring to FIG. 12, at 1208, the base station 1202 may identify one or more beams toward a node 1204 for communication with at least one UE 1206.

At 1304, the base station may transmit, to the node, an indication to adjust a surface phase of the node corresponding to the one or more beams or one of the plurality of beams from the node. For example, 1304 may be performed by the IRS beam component 1740 in FIG. 17. Referring to FIG. 12, at 1210, the base station 1202 may transmit, to the node 1204, an indication to adjust a surface phase of the node 1204 corresponding to the one or more beams or one of the plurality of beams from the node 1204.

At 1306, the base station may select at least one beam of the plurality of beams from the node for communication with the at least one UE. The at least one beam may be selected based on a defocusing operation in connection with a virtual focal point and at least one of: an azimuth or an elevation of the at least one beam, a RACH message from the at least one UE, an RSRP measurement of the at least one beam, or a width or a height of an enabled surface area of the node. For example, 1306 may be performed by the IRS beam component 1740 in FIG. 17. Referring to FIG. 12, at 1212, the base station 1202 may select at least one beam of the plurality of beams from the node 1204 for communication with the at least one UE 1206.

At 1308, the base station may transmit, to the at least one UE via the node, or receive, from the at least one UE via the node, communication via the at least one beam. For example, 1308 may be performed by the IRS beam component 1740 in FIG. 17. Referring to FIG. 12, at 1232, the base station 1202 may transmit, to the at least one UE 1206 via the node 1204, or receive, from the at least one UE 1206 via the node 1204, communication via the at least one beam.

Figure 14:
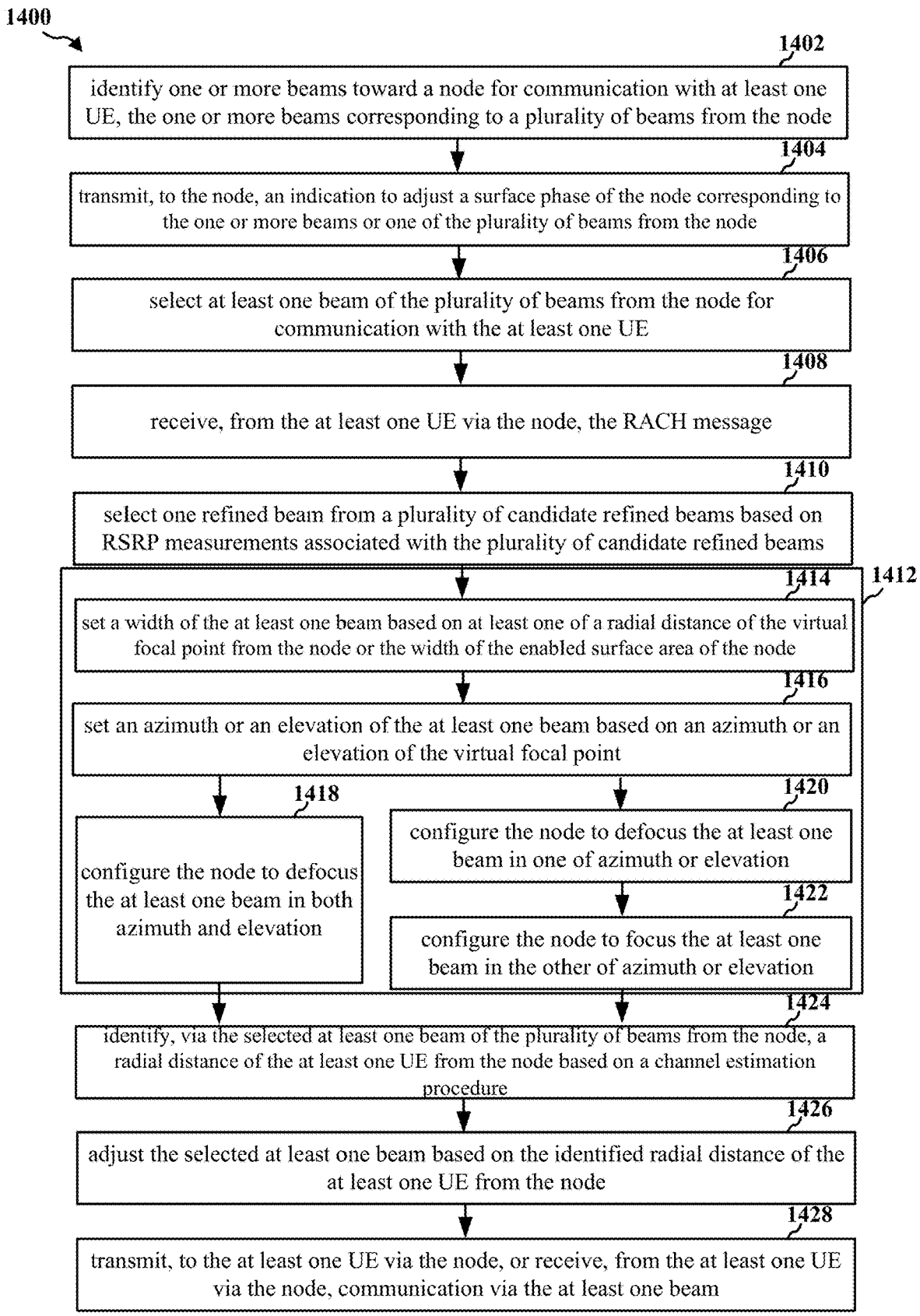
FIG. 14 is a flowchart of a method of wireless communication.

FIG. 14 is a flowchart 1400 of a method of wireless communication. The method may be performed by a base station (e.g., the base station 102/180/310/1202; the apparatus 1702). At 1402, the base station may identify one or more beams toward a node for communication with at least one UE. The one or more beams may correspond to a plurality of beams from the node. For example, 1402 may be performed by the IRS beam component 1740 in FIG. 17. Referring to FIG. 12, at 1208, the base station 1202 may identify one or more beams toward a node 1204 for communication with at least one UE 1206.

At 1404, the base station may transmit, to the node, an indication to adjust a surface phase of the node corresponding to the one or more beams or one of the plurality of beams from the node. For example, 1404 may be performed by the IRS beam component 1740 in FIG. 17. Referring to FIG. 12, at 1210, the base station 1202 may transmit, to the node

1204, an indication to adjust a surface phase of the node 1204 corresponding to the one or more beams or one of the plurality of beams from the node 1204.

At 1406, the base station may select at least one beam of the plurality of beams from the node for communication with the at least one UE. The at least one beam may be selected based on a defocusing operation in connection with a virtual focal point and at least one of: an azimuth or an elevation of the at least one beam, a RACH message from the at least one UE, an RSRP measurement of the at least one beam, or a width or a height of an enabled surface area of the node. For example, 1406 may be performed by the IRS beam component 1740 in FIG. 17. Referring to FIG. 12, at 1212, the base station 1202 may select at least one beam of the plurality of beams from the node 1204 for communication with the at least one UE 1206.

At 1428, the base station may transmit, to the at least one UE via the node, or receive, from the at least one UE via the node, communication via the at least one beam. For example, 1428 may be performed by the IRS beam component 1740 in FIG. 17. Referring to FIG. 12, at 1232, the base station 1202 may transmit, to the at least one UE 1206 via the node 1204, or receive, from the at least one UE 1206 via the node 1204, communication via the at least one beam.

In one configuration, the one or more beams may correspond to at least one of an SSB beam, a CSI-RS, or an SRS.

In one configuration, the node may be an IRS.

In one configuration, the indication to adjust the surface phase of the node may be a control signal.

In one configuration, at 1408, the base station may receive, from the at least one UE via the node, the RACH message. The selected at least one beam may correspond to the RACH message corresponds to a starting candidate beam. For example, 1408 may be performed by the IRS beam component 1740 in FIG. 17. Referring to FIG. 12, at 1214, the base station 1202 may receive, from the at least one UE 1206 via the node 1204, the RACH message.

In one configuration, the at least one beam may be selected from the plurality of beams from the node based on an iterative process. In each iteration of the iterative process, at 1410, the base station may select one refined beam from a plurality of candidate refined beams based on RSRP measurements associated with the plurality of candidate refined beams. The selected one refined beam may be associated with a highest RSRP measurement. Each of the plurality of candidate refined beams may be associated with a smaller angular spread than a starting candidate beam of the plurality of beams from the node or a selected refined beam from a previous iteration. Each of the plurality of candidate refined beams may be associated with a coverage area that is inside a coverage area of the starting candidate beam or the selected refined beam from the previous iteration. For example, 1410 may be performed by the IRS beam component 1740 in FIG. 17. Referring to FIG. 12, at 1218, the base station 1202 may select one refined beam from a plurality of candidate refined beams based on RSRP measurements associated with the plurality of candidate refined beams.

In one configuration, the at least one beam may be selected based further on a focusing at infinity operation associated with a selected refined beam from a last iteration.

In one configuration, the starting candidate beam and the plurality of candidate refined beams in each iteration may be each based on a defocusing operation in connection with the virtual focal point.

At 1412, the base station may configure the node to perform the defocusing operation based on the indication to adjust the surface phase of the node. For example, 1412 may be performed by the IRS beam component 1740 in FIG. 17. Referring to FIG. 12, at 1220, the base station 1202 may configure the node 1204 to perform the defocusing operation based on the indication to adjust the surface phase of the node 1204.

In one configuration, to configure the node to perform the defocusing operation, at 1414, the base station may set a width of the at least one beam based on at least one of a radial distance of the virtual focal point from the node or the width of the enabled surface area of the node. For example, 1414 may be performed by the IRS beam component 1740 in FIG. 17. Referring to FIG. 12, at 1222, the base station 1202 may set a width of the at least one beam based on at least one of a radial distance of the virtual focal point from the node 1204 or the width of the enabled surface area of the node 1204.

In one configuration, to configure the node to perform the defocusing operation, at 1416, the base station may set an azimuth or an elevation of the at least one beam based on an azimuth or an elevation of the virtual focal point. For example, 1416 may be performed by the IRS beam component 1740 in FIG. 17. Referring to FIG. 12, at 1224, the base station 1202 may set an azimuth or an elevation of the at least one beam based on an azimuth or an elevation of the virtual focal point.

In one configuration, to configure the node to perform the defocusing operation, at 1418, the base station may configure the node to defocus the at least one beam in both azimuth and elevation. For example, 1418 may be performed by the IRS beam component 1740 in FIG. 17. Referring to FIG. 12, at 1226a, the base station 1202 may configure the node 1204 to defocus the at least one beam in both azimuth and elevation.

In one configuration, to configure the node to perform the defocusing operation, at 1420, the base station may configure the node to defocus the at least one beam in one of azimuth or elevation. For example, 1420 may be performed by the IRS beam component 1740 in FIG. 17. Referring to FIG. 12, at 1226b, the base station 1202 may configure the node 1204 to defocus the at least one beam in one of azimuth or elevation. At 1422, the base station may configure the node to focus the at least one beam in the other of azimuth or elevation. For example, 1422 may be performed by the IRS beam component 1740 in FIG. 17. Referring to FIG. 12, at 1226c, the base station 1202 may configure the node 1204 to focus the at least one beam in the other of azimuth or elevation.

In one configuration, at 1424, the base station may identify, via the selected at least one beam of the plurality of beams from the node, a radial distance of the at least one UE from the node based on a channel estimation procedure. For example, 1424 may be performed by the IRS beam component 1740 in FIG. 17. Referring to FIG. 12, at 1228, the base station 1202 may identify, via the selected at least one beam of the plurality of beams from the node 1204, a radial distance of the at least one UE 1206 from the node 1204 based on a channel estimation procedure. At 1426, the base station may adjust the selected at least one beam based on the identified radial distance of the at least one UE from the node. For example, 1426 may be performed by the IRS beam component 1740 in FIG. 17. Referring to FIG. 12, at 1230, the base station 1202 may configure the node 1204 to adjust the selected at least one beam based on the identified radial distance of the at least one UE 1206 from the node 1204.

Figure 15:
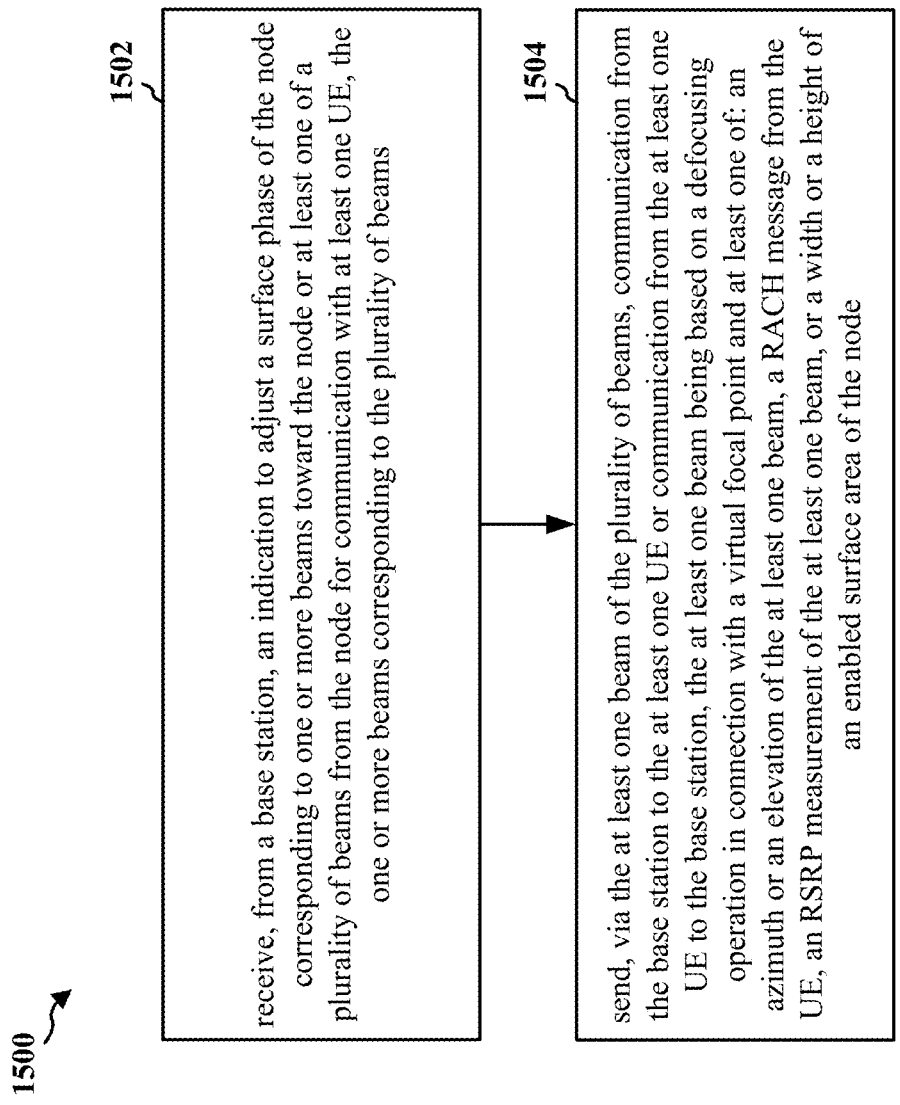
FIG. 15 is a flowchart of a method of wireless communication.

FIG. 15 is a flowchart 1500 of a method of wireless communication. The method may be performed by a node (e.g., the node/IRS 103/1204; the apparatus 1802). At 1502, the node may receive, from a base station, an indication to adjust a surface phase of the node corresponding to one or more beams toward the node or at least one of a plurality of beams from the node for communication with at least one UE. The one or more beams may correspond to the plurality of beams. For example, 1502 may be performed by the IRS beam component 1840 in FIG. 18. Referring to FIG. 12, at 1210, the node 1204 may receive, from a base station 1202, an indication to adjust a surface phase of the node 1204 corresponding to one or more beams toward the node 1204 or at least one of a plurality of beams from the node 1204 for communication with at least one UE 1206.

At 1504, the node may send, via the at least one beam of the plurality of beams, communication from the base station to the at least one UE or communication from the at least one UE to the base station. The at least one beam may be based on a defocusing operation in connection with a virtual focal point and at least one of: an azimuth or an elevation of the at least one beam, a RACH message from the UE, an RSRP measurement of the at least one beam, or a width or a height of an enabled surface area of the node. For example, 1504 may be performed by the IRS beam component 1840 in FIG. 18. Referring to FIG. 12, at 1232, the node 1204 may send, via the at least one beam of the plurality of beams, communication from the base station 1202 to the at least one UE 1206 or communication from the at least one UE 1206 to the base station 1202.

Figure 16:
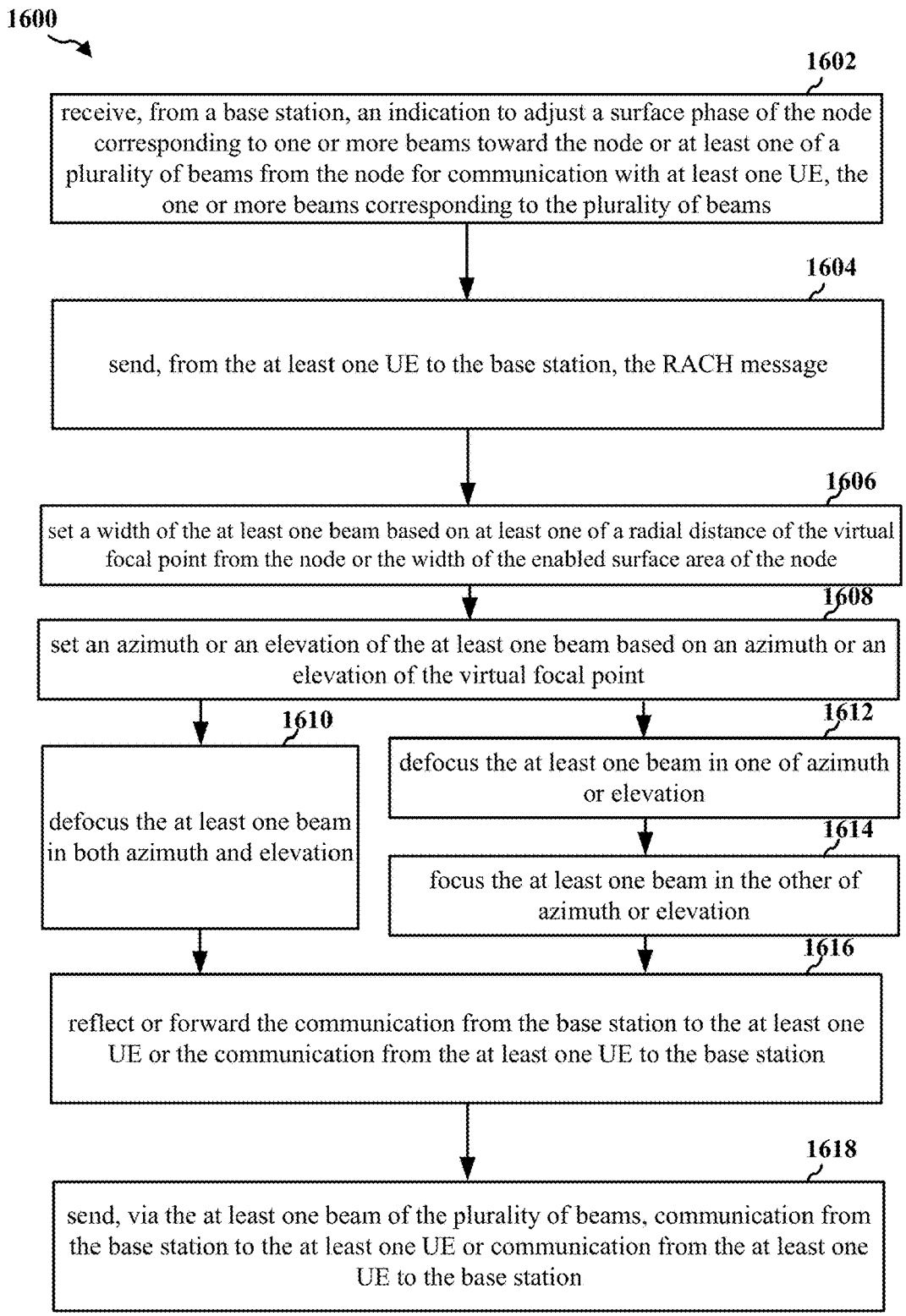
FIG. 16 is a flowchart of a method of wireless communication.

FIG. 16 is a flowchart 1600 of a method of wireless communication. The method may be performed by a node (e.g., the node/IRS 103/1204; the apparatus 1802). At 1602, the node may receive, from a base station, an indication to adjust a surface phase of the node corresponding to one or more beams toward the node or at least one of a plurality of beams from the node for communication with at least one UE. The one or more beams may correspond to the plurality of beams. For example, 1602 may be performed by the IRS beam component 1840 in FIG. 18. Referring to FIG. 12, at 1210, the node 1204 may receive, from a base station 1202, an indication to adjust a surface phase of the node 1204 corresponding to one or more beams toward the node 1204 or at least one of a plurality of beams from the node 1204 for communication with at least one UE 1206.

At 1618, the node may send, via the at least one beam of the plurality of beams, communication from the base station to the at least one UE or communication from the at least one UE to the base station. The at least one beam may be based on a defocusing operation in connection with a virtual focal point and at least one of: an azimuth or an elevation of the at least one beam, a RACH message from the UE, an RSRP measurement of the at least one beam, or a width or a height of an enabled surface area of the node. For example, 1618 may be performed by the IRS beam component 1840 in FIG. 18. Referring to FIG. 12, at 1232, the node 1204 may send, via the at least one beam of the plurality of beams, communication from the base station 1202 to the at least one UE 1206 or communication from the at least one UE 1206 to the base station 1202.

In one configuration, the one or more beams may correspond to at least one of an SSB beam, a CSI-RS, or an SRS.

In one configuration, the node may be an intelligent reflective surface.

In one configuration, the indication to adjust the surface phase of the node may be a control signal.

In one configuration, at 1604, the node may send, from at least one UE to the base station, the RACH message. The at least one beam corresponding to the RACH message may correspond to a starting candidate beam. For example, 1604 may be performed by the IRS beam component 1840 in FIG. 18. Referring to FIG. 12, at 1214, the node 1204 may send, from the at least one UE 1206 to the base station 1202, the RACH message.

In one configuration, to send the communication from the base station to the at least one UE or the communication from the at least one UE to the base station, at 1616, the node may reflect or forward the communication from the base station to the at least one UE or the communication from the at least one UE to the base station. For example, 1616 may be performed by the IRS beam component 1840 in FIG. 18. Referring to FIG. 12, at 1216, the node 1204 may reflect or forward the communication from the base station 1202 to the at least one UE 1206 or the communication from the at least one UE 1206 to the base station 1202.

In one configuration, the at least one beam may be selected from the plurality of beams from the node based on an iterative process. In each iteration of the iterative process, one refined beam may be selected from a plurality of candidate refined beams based on RSRP measurements associated with the plurality of candidate refined beams. The selected one refined beam may be associated with a highest RSRP measurement. Each of the plurality of candidate refined beams may be associated with a smaller angular spread than a starting candidate beam of the plurality of beams from the node or a selected refined beam from a previous iteration. Each of the plurality of candidate refined beams may be associated with a coverage area that is inside a coverage area of the starting candidate beam or the selected refined beam from the previous iteration.

In one configuration, the at least one beam may be based further on a focusing at infinity operation associated with a selected refined beam from a last iteration.

In one configuration, the starting candidate beam and the plurality of candidate refined beams in each iteration may be each based on a defocusing operation in connection with the virtual focal point. The defocusing operation may be based on the indication to adjust the surface phase of the node.

In one configuration, in the defocusing operation, at 1606, the node may set a width of the at least one beam based on at least one of a radial distance of the virtual focal point from the node or the width of the enabled surface area of the node. For example, 1606 may be performed by the IRS beam component 1840 in FIG. 18. Referring to FIG. 12, at 1222, the node 1204 may set a width of the at least one beam based on at least one of a radial distance of the virtual focal point from the node 1204 or the width of the enabled surface area of the node 1204.

In one configuration, in the defocusing operation, at 1608, the node may set an azimuth or an elevation of the at least one beam based on an azimuth or an elevation of the virtual focal point. For example, 1608 may be performed by the IRS beam component 1840 in FIG. 18. Referring to FIG. 12, at 1224, the node 1204 may set an azimuth or an elevation of the at least one beam based on an azimuth or an elevation of the virtual focal point.

In one configuration, in the defocusing operation, at 1610, the node may defocus the at least one beam in both azimuth and elevation. For example, 1610 may be performed by the IRS beam component 1840 in FIG. 18. Referring to FIG. 12, at 1226*a*, the node 1204 may defocus the at least one beam in both azimuth and elevation.

In one configuration, in the defocusing operation, at 1612, the node may defocus the at least one beam in one of azimuth or elevation. For example, 1612 may be performed by the IRS beam component 1840 in FIG. 18. Referring to FIG. 12, at 1226b, the node 1204 may defocus the at least one beam in one of azimuth or elevation. At 1614, the node may focus the at least one beam in the other of azimuth or elevation. For example, 1614 may be performed by the IRS beam component 1840 in FIG. 18. Referring to FIG. 12, at 1226c, the node 1204 may focus the at least one beam in the other of azimuth or elevation.

In one configuration, the at least one beam may be based further on a radial distance of the at least one UE from the node.

Figure 17:
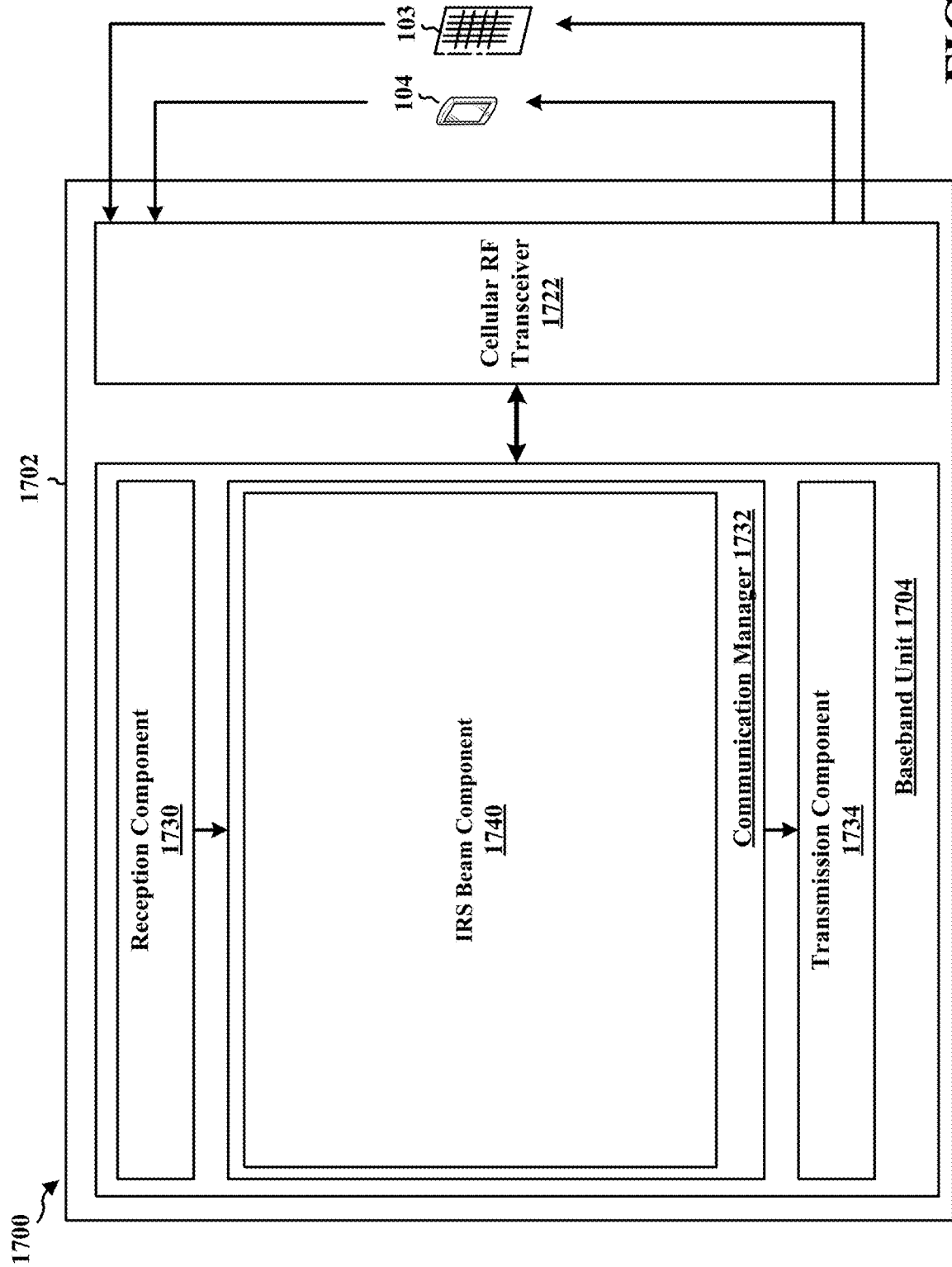
FIG. 17 is a diagram illustrating an example of a hardware implementation for an example apparatus.

FIG. 17 is a diagram 1700 illustrating an example of a hardware implementation for an apparatus 1702. The apparatus 1702 may be a base station, a component of a base station, or may implement base station functionality. In some aspects, the apparatus 1702 may include a baseband unit 1704. The baseband unit 1704 may communicate through a cellular RF transceiver 1722 with the UE 104. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the base station 310 and may include the memory 376 and/or at least one of the TX processor 316, the RX processor 370, and the controller/processor 375.

The communication manager 1732 includes an IRS beam component 1740 that may be configured to identify one or more beams toward a node for communication with at least one UE, e.g., as described in connection with 1302 in FIGS. 13 and 1402 in FIG. 14. The IRS beam component 1740 may be configured to transmit, to the node, an indication to adjust a surface phase of the node corresponding to the one or more beams or one of the plurality of beams from the node, e.g., as described in connection with 1304 in FIGS. 13 and 1404 in FIG. 14. The IRS beam component 1740 may be configured to select at least one beam of the plurality of beams from the node for communication with the at least one UE, e.g., as described in connection with 1306 in FIGS. 13 and 1406 in FIG. 14. The IRS beam component 1740 may be configured to receive, from the at least one UE via the node, the RACH message, e.g., as described in connection with 1408 in FIG. 14. The IRS beam component 1740 may be configured to select one refined beam from a plurality of candidate refined beams based on RSRP measurements associated with the plurality of candidate refined beams, e.g., as described in connection with 1410 in FIG. 14. The IRS beam component 1740 may be configured to configure the node to perform the defocusing operation based on the indication to adjust the surface phase of the node, e.g., as described in connection with 1412 in FIG. 14. The IRS beam component 1740 may be configured to set a width of the at least one beam based on at least one of a radial distance of the virtual focal point from the node or the width of the enabled surface area of the node, e.g., as described in connection with 1414 in FIG. 14. The IRS beam component 1740 may be configured to set an azimuth or an elevation of the at least one beam based on an azimuth or an elevation of the virtual focal point, e.g., as described in connection with 1416 in FIG. 14. The IRS beam component 1740 may be configured to configure the node to defocus the at least one beam in both azimuth and elevation, e.g., as described in connection with 1418 in FIG. 14. The IRS beam component 1740 may be configured to configure the node to defocus the at least one beam in one of azimuth or elevation, e.g., as described in connection with 1420 in FIG. 14. The IRS beam component 1740 may be configured to configure the node to focus the at least one beam in the other of azimuth or elevation, e.g., as described in connection with 1422 in FIG. 14. The IRS beam component 1740 may be configured to identify, via the selected at least one beam of the plurality of beams from the node, a radial distance of the at least one UE from the node based on a channel estimation procedure, e.g., as described in connection with 1424 in FIG. 14. The IRS beam component 1740 may be configured to adjust the selected at least one beam based on the identified radial distance of the at least one UE from the node, e.g., as described in connection with 1426 in FIG. 14. The IRS beam component 1740 may be configured to transmit, to the at least one UE via the node, or receive, from the at least one UE via the node, communication via the at least one beam, e.g., as described in connection with 1308 in FIGS. 13 and 1428 in FIG. 14.

The apparatus may include additional components that perform each of the blocks of the algorithm in the flowcharts of FIGS. 12-14. As such, each block in the flowcharts of FIGS. 12-14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the baseband unit 1704, includes means for identifying one or more beams toward a node for communication with at least one UE. The one or more beams may correspond to a plurality of beams from the node. The apparatus 1702 may include means for transmitting, to the node, an indication to adjust a surface phase of the node corresponding to the one or more beams or one of the plurality of beams from the node. The apparatus 1702 may include means for selecting at least one beam of the plurality of beams from the node for communication with the at least one UE. The at least one beam may be selected based on a defocusing operation in connection with a virtual focal point and at least one of: an azimuth or an elevation of the at least one beam, a RACH message from the at least one UE, an RSRP measurement of the at least one beam, or a width or a height of an enabled surface area of the node. The apparatus 1702 may include means for transmitting, to the at least one UE via the node, or receiving, from the at least one UE via the node, communication via the at least one beam.

In one configuration, the one or more beams may correspond to at least one of an SSB beam, a CSI-RS, or an SRS. In one configuration, the node may be an IRS. In one configuration, the indication to adjust the surface phase of the node may be a control signal. In one configuration, the apparatus 1702 may include means for receiving, from the at least one UE via the node, the RACH message. The selected at least one beam may correspond to the RACH message corresponds to a starting candidate beam. In one configuration, the at least one beam may be selected from the plurality of beams from the node based on an iterative process. In each iteration of the iterative process, the apparatus 1702 may include means for selecting one refined beam from a plurality of candidate refined beams based on RSRP measurements associated with the plurality of candidate refined beams. The selected one refined beam may be associated with a highest RSRP measurement. Each of the plurality of candidate refined beams may be associated with a smaller angular spread than a starting candidate beam of the plurality of beams from the node or a selected refined beam from a previous iteration. Each of the plurality of candidate refined beams may be associated with a coverage area that is inside a coverage area of the starting candidate beam or the selected refined beam from the previous iteration. In one configuration, the at least one beam may be selected based further on a focusing at infinity operation associated with a selected refined beam from a last iteration. In one configuration, the starting candidate beam and the plurality of candidate refined beams in each iteration may be each based on a defocusing operation in connection with the virtual focal point. The apparatus 1702 may include means for configuring the node to perform the defocusing operation based on the indication to adjust the surface phase of the node. In one configuration, to configure the node to perform the defocusing operation, the apparatus 1702 may include means for setting a width of the at least one beam based on at least one of a radial distance of the virtual focal point from the node or the width of the enabled surface area of the node. In one configuration, to configure the node to perform the defocusing operation, the apparatus 1702 may include means for setting an azimuth or an elevation of the at least one beam based on an azimuth or an elevation of the virtual focal point. In one configuration, to configure the node to perform the defocusing operation, the apparatus 1702 may include means for configuring the node to defocus the at least one beam in both azimuth and elevation. In one configuration, to configure the node to perform the defocusing operation, the apparatus 1702 may include means for configuring the node to defocus the at least one beam in one of azimuth or elevation. The apparatus 1702 may include means for configuring the node to focus the at least one beam in the other of azimuth or elevation. In one configuration, the apparatus 1702 may include means for identifying, via the selected at least one beam of the plurality of beams from the node, a radial distance of the at least one UE from the node based on a channel estimation procedure. The apparatus 1702 may include means for configuring the node to adjust the selected at least one beam based on the identified radial distance of the at least one UE from the node.

The means may be one or more of the components of the apparatus 1702 configured to perform the functions recited by the means. As described supra, the apparatus 1702 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 18:
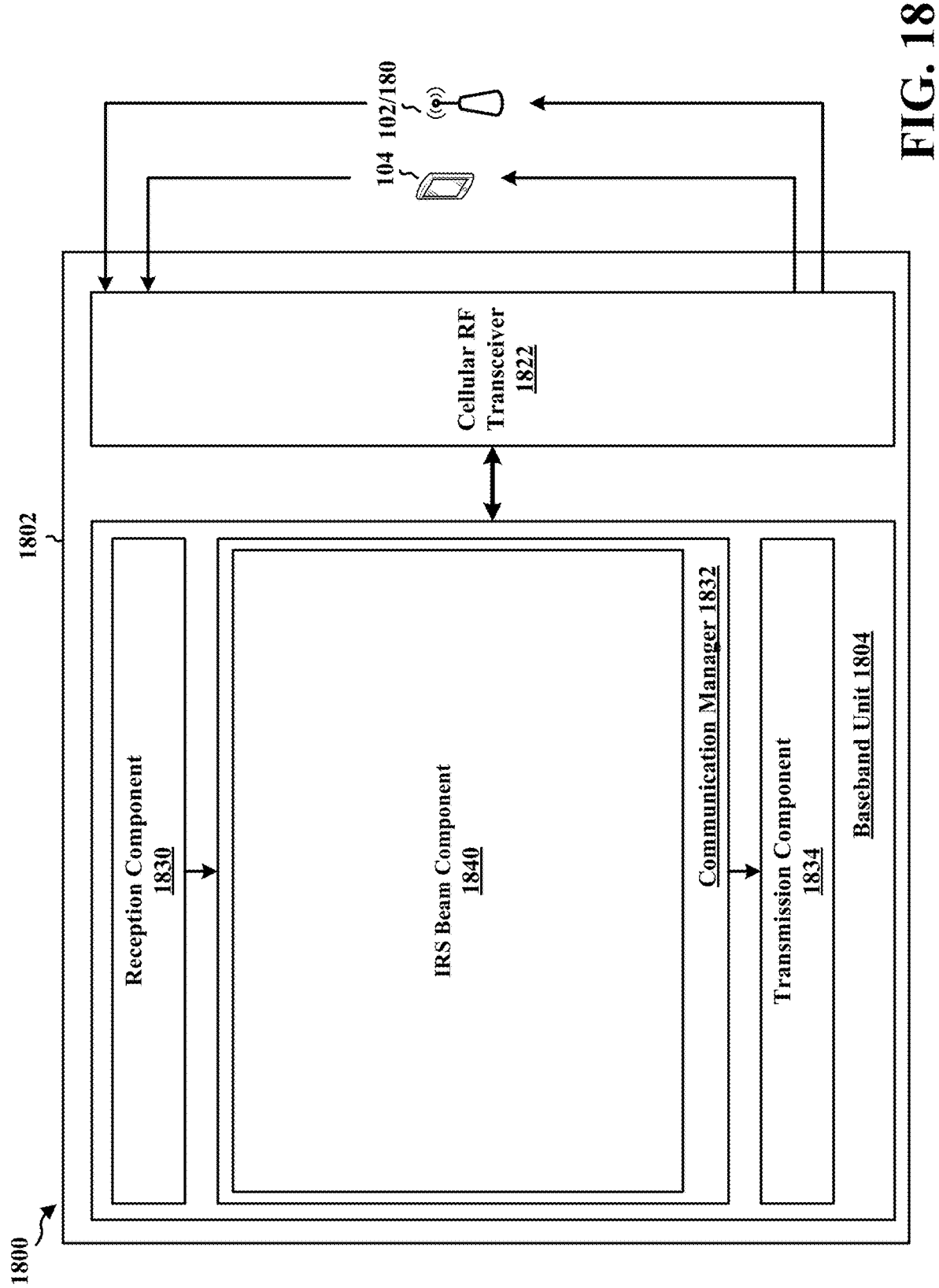
FIG. 18 is a diagram illustrating an example of a hardware implementation for an example apparatus.

FIG. 18 is a diagram 1800 illustrating an example of a hardware implementation for an apparatus 1802. The apparatus 1802 may be a node, an IRS, a component of a node, a component of an IRS, or may implement node/IRS functionality. In some aspects, the apparatus 1802 may include a baseband unit 1804. The baseband unit 1804 may communicate through a cellular RF transceiver 1822 with the UE 104. The baseband unit 1804 may include a computer-readable medium/memory. The baseband unit 1804 is responsible for general processing, including the execution of software stored on the computer-readable medium/memory. The software, when executed by the baseband unit 1804, causes the baseband unit 1804 to perform the various functions described supra. The computer-readable medium/memory may also be used for storing data that is manipulated by the baseband unit 1804 when executing software. The baseband unit 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband unit 1804.

The communication manager 1832 includes an IRS beam component 1840 that may be configured to receive, from a base station, an indication to adjust a surface phase of the node corresponding to one or more beams toward the node or at least one of a plurality of beams from the node for communication with at least one UE, e.g., as described in connection with 1502 in FIGS. 15 and 1602 in FIG. 16. The IRS beam component 1840 may be configured to send, from the at least one UE to the base station, the RACH message, e.g., as described in connection with 1604 in FIG. 16. The IRS beam component 1840 may be configured to set a width of the at least one beam based on at least one of a radial distance of the virtual focal point from the node or the width of the enabled surface area of the node, e.g., as described in connection with 1606 in FIG. 16. The IRS beam component 1840 may be configured to set an azimuth or an elevation of the at least one beam based on an azimuth or an elevation of the virtual focal point, e.g., as described in connection with 1608 in FIG. 16. The IRS beam component 1840 may be configured to defocus the at least one beam in both azimuth and elevation, e.g., as described in connection with 1610 in FIG. 16. The IRS beam component 1840 may be configured to defocus the at least one beam in one of azimuth or elevation, e.g., as described in connection with 1612 in FIG. 16. The IRS beam component 1840 may be configured to focus the at least one beam in the other of azimuth or elevation, e.g., as described in connection with 1614 in FIG. 16. The IRS beam component 1840 may be configured to reflect or forward the communication from the base station to the at least one UE or the communication from the at least one UE to the base station, e.g., as described in connection with 1616 in FIG. 16. The IRS beam component 1840 may be configured to send, via the at least one beam of the plurality of beams, communication from the base station to the at least one UE or communication from the at least one UE to the base station, e.g., as described in connection with 1504 in FIGS. 15 and 1618 in FIG. 16.

The apparatus may include additional components that perform each of the blocks of the algorithm in the flowcharts of FIGS. 12, 15, and 16. As such, each block in the flowcharts of FIGS. 12, 15, and 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the baseband unit 1804, includes means for receiving, from a base station, an indication to adjust a surface phase of the node corresponding to one or more beams toward the node or at least one of a plurality of beams from the node for communication with at least one UE. The one or more beams may correspond to the plurality of beams. The apparatus 1802 may include means for sending, via the at least one beam of the plurality of beams, communication from the base station to the at least one UE or communication from the at least one UE to the base station. The at least one beam may be based on a defocusing operation in connection with a virtual focal point and at least one of: an azimuth or an elevation of the at least one beam, a RACH message from the UE, an RSRP measurement of the at least one beam, or a width or a height of an enabled surface area of the node.

In one configuration, the one or more beams may correspond to at least one of an SSB beam, a CSI-RS, or an SRS. In one configuration, the node may be an intelligent reflective surface. In one configuration, the indication to adjust the surface phase of the node may be a control signal. In one configuration, the apparatus 1802 may include means for sending, from the at least one UE to the base station, the RACH message. The at least one beam corresponding to the RACH message may correspond to a starting candidate beam. In one configuration, to send the communication from the base station to the at least one UE or the communication from the at least one UE to the base station, the apparatus 1802 may include means for reflecting or forwarding the communication from the base station to the at least one UE or the communication from the at least one UE to the base station. In one configuration, the at least one beam may be selected from the plurality of beams from the node based on an iterative process. In each iteration of the iterative process, one refined beam may be selected from a plurality of candidate refined beams based on RSRP measurements associated with the plurality of candidate refined beams. The selected one refined beam may be associated with a highest RSRP measurement. Each of the plurality of candidate refined beams may be associated with a smaller angular spread than a starting candidate beam of the plurality of beams from the node or a selected refined beam from a previous iteration. Each of the plurality of candidate refined beams may be associated with a coverage area that is inside a coverage area of the starting candidate beam or the selected refined beam from the previous iteration. In one configuration, the at least one beam may be based further on a focusing at infinity operation associated with a selected refined beam from a last iteration. In one configuration, the starting candidate beam and the plurality of candidate refined beams in each iteration may be each based on a defocusing operation in connection with the virtual focal point. The defocusing operation may be based on the indication to adjust the surface phase of the node. In one configuration, in the defocusing operation, the apparatus 1802 may include means for setting a width of the at least one beam based on at least one of a radial distance of the virtual focal point from the node or the width of the enabled surface area of the node. In one configuration, in the defocusing operation, the apparatus 1802 may include means for setting an azimuth or an elevation of the at least one beam based on an azimuth or an elevation of the virtual focal point. In one configuration, in the defocusing operation, the apparatus 1802 may include means for defocusing the at least one beam in both azimuth and elevation. In one configuration, in the defocusing operation, the apparatus 1802 may include means for defocusing the at least one beam in one of azimuth or elevation. The apparatus 1802 may include means for focusing the at least one beam in the other of azimuth or elevation. In one configuration, the at least one beam may be based further on a radial distance of the at least one UE from the node.

The means may be one or more of the components of the apparatus 1802 configured to perform the functions recited by the means.

In an aspect of the disclosure, a base station may identify one or more beams toward an IRS for communication with at least one UE. The one or more beams may correspond to a plurality of beams from the IRS. The base station may transmit, to the IRS, an indication to adjust a surface phase of the IRS corresponding to the one or more beams or one of the plurality of beams from the IRS. The base station may select at least one beam of the plurality of beams from the IRS for communication with the at least one UE. The at least one beam may be selected based on a defocusing operation in connection with a virtual focal point and at least one of: an azimuth or an elevation of the at least one beam, a RACH message from the at least one UE, an RSRP measurement of the at least one beam, or a width or a height of an enabled surface area of the IRS. The base station may transmit, to the at least one UE via the IRS, or receive, from the at least one UE via the IRS, communication via the at least one beam. Accordingly, suitable beams may be identified and used for the communication between the base station and the UE based on the initial acquisition and beam refinement procedures described herein. Because the beam squint may be nonexistent or negligible, a wide area of the IRS may be enabled for reflecting the beams, providing an appreciable energy gain.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a base station including at least one processor coupled to a memory and configured to identify one or more beams toward a node for communication with at least one UE, the one or more beams corresponding to a plurality of beams from the node; transmit, to the node, an indication to adjust a surface phase of the node corresponding to the one or more beams or one of the plurality of beams from the node; select at least one beam of the plurality of beams from the node for communication with the at least one UE, the at least one beam being selected based on a defocusing operation in connection with a virtual focal point and at least one of: an azimuth or an elevation of the at least one beam, a RACH message from the at least one UE, an RSRP measurement of the at least one beam, or a width or a height of an enabled surface area of the node; and transmit, to the at least one UE via the node, or receive, from the at least one UE via the node, communication via the at least one beam.

Aspect 2 is the apparatus of aspect 1, where the one or more beams correspond to at least one of an SSB beam, a CSI-RS, or an SRS.

Aspect 3 is the apparatus of any of aspects 1 and 2, where the node is an IRS.

Aspect 4 is the apparatus of any of aspects 1 to 3, where the indication to adjust the surface phase of the node is a control signal.

Aspect 5 is the apparatus of any of aspects 1 to 4, the processor being further configured to: receive, from the at least one UE via the node, the RACH message, where the selected at least one beam corresponding to the RACH message corresponds to a starting candidate beam.

Aspect 6 is the apparatus of any of aspects 1 to 5, where the at least one beam is selected from the plurality of beams from the node based on an iterative process, and in each iteration of the iterative process, the at least one processor is further configured to: select one refined beam from a plurality of candidate refined beams based on RSRP measurements associated with the plurality of candidate refined beams, where the selected one refined beam is associated with a highest RSRP measurement, each of the plurality of candidate refined beams is associated with a smaller angular spread than a starting candidate beam of the plurality of beams from the node or a selected refined beam from a previous iteration, and each of the plurality of candidate refined beams is associated with a coverage area that is inside a coverage area of the starting candidate beam or the selected refined beam from the previous iteration.

Aspect 7 is the apparatus of aspect 6, where the at least one beam is selected based further on a focusing at infinity operation associated with a selected refined beam from a last iteration.

Aspect 8 is the apparatus of any of aspects 1 to 7, the at least one processor being further configured to: configure the node to perform the defocusing operation based on the indication to adjust the surface phase of the node.

Aspect 9 is the apparatus of aspect 8, where to configure the node to perform the defocusing operation, the at least one processor is further configured to: set a width of the at least one beam based on at least one of a radial distance of the virtual focal point from the node or the width of the enabled surface area of the node.

Aspect 10 is the apparatus of any of aspects 8 and 9, where to configure the node to perform the defocusing operation, the at least one processor is further configured to: set an azimuth or an elevation of the at least one beam based on an azimuth or an elevation of the virtual focal point.

Aspect 11 is the apparatus of any of aspects 8 to 10, where to configure the node to perform the defocusing operation, the at least one processor is further configured to: configure the node to defocus the at least one beam in both azimuth and elevation.

Aspect 12 is the apparatus of any of aspects 8 to 10, where to configure the node to perform the defocusing operation, the at least one processor is further configured to: configure the node to defocus the at least one beam in one of azimuth or elevation; and configure the node to focus the at least one beam in the other of azimuth or elevation.

Aspect 13 is the apparatus of any of aspects 1 to 12, the at least one processor being further configured to: identify, via the selected at least one beam of the plurality of beams from the node, a radial distance of the at least one UE from the node based on a channel estimation procedure; and configure the node to adjust the selected at least one beam based on the identified radial distance of the at least one UE from the node.

Aspect 14 is the apparatus of any of aspects 1 to 13, further including a transceiver coupled to the at least one processor.

Aspect 15 is an apparatus for wireless communication at a node including at least one processor coupled to a memory and configured to receive, from a base station, an indication to adjust a surface phase of the node corresponding to one or more beams toward the node or at least one of a plurality of beams from the node for communication with at least one UE, the one or more beams corresponding to the plurality of beams; and send, via the at least one beam of the plurality of beams, communication from the base station to the at least one UE or communication from the at least one UE to the base station, the at least one beam being based on a defocusing operation in connection with a virtual focal point and at least one of: an azimuth or an elevation of the at least one beam, a RACH message from the UE, an RSRP measurement of the at least one beam, or a width or a height of an enabled surface area of the node.

Aspect 16 is the apparatus of aspect 15, where the one or more beams correspond to at least one of an SSB beam, a CSI-RS, or an SRS.

Aspect 17 is the apparatus of any of aspects 15 and 16, where the node is an IRS.

Aspect 18 is the apparatus of any of aspects 15 to 17, where the indication to adjust the surface phase of the node is a control signal.

Aspect 19 is the apparatus of any of aspects 15 to 18, the at least one processor being further configured to: send, from the at least one UE to the base station, the RACH message, where the at least one beam corresponding to the RACH message corresponds to a starting candidate beam.

Aspect 20 is the apparatus of any of aspects 15 to 19, where to send the communication from the base station to the at least one UE or the communication from the at least one UE to the base station, the at least one processor is further configured to: reflect or forward the communication from the base station to the at least one UE or the communication from the at least one UE to the base station.

Aspect 21 is the apparatus of any of aspects 15 to 20, where the at least one beam is selected from the plurality of beams from the node based on an iterative process, and in each iteration of the iterative process, one refined beam is selected from a plurality of candidate refined beams based on RSRP measurements associated with the plurality of candidate refined beams, where the selected one refined beam is associated with a highest RSRP measurement, each of the plurality of candidate refined beams is associated with a smaller angular spread than a starting candidate beam of the plurality of beams from the node or a selected refined beam from a previous iteration, and each of the plurality of candidate refined beams is associated with a coverage area that is inside a coverage area of the starting candidate beam or the selected refined beam from the previous iteration.

Aspect 22 is the apparatus of aspect 21, where the at least one beam is based further on a focusing at infinity operation associated with a selected refined beam from a last iteration.

Aspect 23 is the apparatus of any of aspects 21 and 22, where the starting candidate beam and the plurality of candidate refined beams in each iteration are each based on a defocusing operation in connection with the virtual focal point, and the defocusing operation is based on the indication to adjust the surface phase of the node.

Aspect 24 is the apparatus of any of aspects 15 to 23, where in the defocusing operation, the at least one processor is configured to: set a width of the at least one beam based on at least one of a radial distance of the virtual focal point from the node or the width of the enabled surface area of the node.

Aspect 25 is the apparatus of any of aspects 15 to 24, where in the defocusing operation, the at least one processor is configured to: set an azimuth or an elevation of the at least one beam based on an azimuth or an elevation of the virtual focal point.

Aspect 26 is the apparatus of any of aspects 15 to 25, where in the defocusing operation, the at least one processor is configured to: defocus the at least one beam in both azimuth and elevation.

Aspect 27 is the apparatus of any of aspects 15 to 25, where in the defocusing operation, the at least one processor is configured to: defocus the at least one beam in one of azimuth or elevation; and focus the at least one beam in the other of azimuth or elevation.

Aspect 28 is the apparatus of any of aspects 15 to 27, where the at least one beam is based further on a radial distance of the at least one UE from the node.

Aspect 29 is the apparatus of any of aspects 15 to 28, further including a transceiver coupled to the at least one processor.

Aspect 30 is a method of wireless communication for implementing any of aspects 1 to 29.

Aspect 31 is an apparatus for wireless communication including means for implementing any of aspects 1 to 29.

Aspect 32 is a computer-readable medium storing computer executable code, where the code when executed by a processor causes the processor to implement any of aspects 1 to 29.

What is claimed is:

1. An apparatus for wireless communication at a base station, comprising:
a memory; and
at least one processor coupled to the memory and configured to:
identify one or more beams toward a node for communication with at least one user equipment (UE), the one or more beams corresponding to a plurality of beams from the node;
transmit, to the node, an indication to adjust a surface phase of the node corresponding to the one or more beams or one of the plurality of beams from the node;
select at least one beam of the plurality of beams from the node for communication with the at least one UE, the at least one beam being selected based on a defocusing operation in connection with a virtual focal point and at least one of: an azimuth or an elevation of the at least one beam, a random access channel (RACH) message from the at least one UE, a reference signal received power (RSRP) measurement of the at least one beam, or a width or a height of an enabled surface area of the node; and
transmit, to the at least one UE via the node, or receive, from the at least one UE via the node, communication via the at least one beam.

2. The apparatus of claim 1, wherein the one or more beams correspond to at least one of a synchronization signal block (SSB) beam, a channel state information (CSI)—reference signal (RS) (CSI-RS), or a sounding reference signal (SRS).

3. The apparatus of claim 1, wherein the node is an intelligent reflective surface (IRS).

4. The apparatus of claim 1, wherein the indication to adjust the surface phase of the node is a control signal.

5. The apparatus of claim 1, the processor being further configured to:
receive, from the at least one UE via the node, the RACH message, wherein the selected at least one beam corresponding to the RACH message corresponds to a starting candidate beam.

6. The apparatus of claim 1, wherein the at least one beam is selected from the plurality of beams from the node based on an iterative process, and in each iteration of the iterative process, the at least one processor is further configured to:
select one refined beam from a plurality of candidate refined beams based on RSRP measurements associated with the plurality of candidate refined beams,
wherein the selected one refined beam is associated with a highest RSRP measurement, each of the plurality of candidate refined beams is associated with a smaller angular spread than a starting candidate beam of the plurality of beams from the node or a selected refined beam from a previous iteration, and each of the plurality of candidate refined beams is associated with a coverage area that is inside a coverage area of the starting candidate beam or the selected refined beam from the previous iteration.

7. The apparatus of claim 6, wherein the at least one beam is selected based further on a focusing at infinity operation associated with a selected refined beam from a last iteration.

8. The apparatus of claim 1, the at least one processor being further configured to:
configure the node to perform the defocusing operation based on the indication to adjust the surface phase of the node.

9. The apparatus of claim 8, wherein to configure the node to perform the defocusing operation, the at least one processor is further configured to:
set a width of the at least one beam of the plurality of beams based on at least one of a radial distance of the virtual focal point from the node or the width of the enabled surface area of the node.

10. The apparatus of claim 8, wherein to configure the node to perform the defocusing operation, the at least one processor is further configured to:
set an azimuth or an elevation of the at least one beam of the plurality of beams based on an azimuth or an elevation of the virtual focal point.

11. The apparatus of claim 8, wherein to configure the node to perform the defocusing operation, the at least one processor is further configured to:
configure the node to defocus the at least one beam of the plurality of beams in both azimuth and elevation.

12. The apparatus of claim 8, wherein to configure the node to perform the defocusing operation, the at least one processor is further configured to:
configure the node to defocus the at least one beam of the plurality of beams in one of azimuth or elevation; and
configure the node to focus the at least one beam of the plurality of beams in the other of azimuth or elevation.

13. The apparatus of claim 1, the at least one processor being further configured to:
identify, via the selected at least one beam of the plurality of beams from the node, a radial distance of the at least one UE from the node based on a channel estimation procedure; and
configure the node to adjust the selected at least one beam based on the identified radial distance of the at least one UE from the node.

14. The apparatus of claim 1, further comprising a transceiver coupled to the at least one processor.

15. A method of wireless communication at a base station, comprising:
identifying one or more beams toward a node for communication with at least one user equipment (UE), the one or more beams corresponding to a plurality of beams from the node;
transmitting, to the node, an indication to adjust a surface phase of the node corresponding to the one or more beams or one of the plurality of beams from the node;
selecting at least one beam of the plurality of beams from the node for communication with the at least one UE, the at least one beam being selected based on a defocusing operation in connection with a virtual focal point and at least one of: an azimuth or an elevation of the at least one beam, a random access channel (RACH) message from the at least one UE, a reference signal received power (RSRP) measurement of the at least one beam, or a width or a height of an enabled surface area of the node; and
transmitting, to the at least one UE via the node, or receiving, from the at least one UE via the node, communication via the at least one beam.

16. An apparatus for wireless communication at a node, comprising:
a memory; and
at least one processor coupled to the memory and configured to:
receive, from a base station, an indication to adjust a surface phase of the node corresponding to one or more beams toward the node or at least one of a plurality of beams from the node for communication with at least one user equipment (UE), the one or more beams corresponding to the plurality of beams; and
send, via the at least one beam of the plurality of beams, communication from the base station to the at least one UE or communication from the at least one UE to the base station, the at least one beam being based on a defocusing operation in connection with a virtual focal point and at least one of: an azimuth or an elevation of the at least one beam, a random access channel (RACH) message from the UE, a reference signal received power (RSRP) measurement of the at least one beam, or a width or a height of an enabled surface area of the node.

17. The apparatus of claim 16, wherein the one or more beams correspond to at least one of a synchronization signal block (SSB) beam, a channel state information (CSI)—reference signal (RS) (CSI-RS), or a sounding reference signal (SRS).

18. The apparatus of claim 16, wherein the node is an intelligent reflective surface (IRS).

19. The apparatus of claim 16, the at least one processor being further configured to:
send, from the at least one UE to the base station, the RACH message, wherein the at least one beam corresponding to the RACH message corresponds to a starting candidate beam.

20. The apparatus of claim 16, wherein to send the communication from the base station to the at least one UE or the communication from the at least one UE to the base station, the at least one processor is further configured to:
reflect or forward the communication from the base station to the at least one UE or the communication from the at least one UE to the base station.

21. The apparatus of claim 16, wherein the at least one beam is selected from the plurality of beams from the node based on an iterative process, and in each iteration of the iterative process, one refined beam is selected from a plurality of candidate refined beams based on RSRP measurements associated with the plurality of candidate refined beams,
wherein the selected one refined beam is associated with a highest RSRP measurement, each of the plurality of candidate refined beams is associated with a smaller angular spread than a starting candidate beam of the plurality of beams from the node or a selected refined beam from a previous iteration, and each of the plurality of candidate refined beams is associated with a coverage area that is inside a coverage area of the starting candidate beam or the selected refined beam from the previous iteration.

22. The apparatus of claim 21, wherein the at least one beam is based further on a focusing at infinity operation associated with a selected refined beam from a last iteration.

23. The apparatus of claim 21, wherein the starting candidate beam and the plurality of candidate refined beams in each iteration are each based on the defocusing operation in connection with the virtual focal point, and the defocusing operation is based on the indication to adjust the surface phase of the node.

24. The apparatus of claim 16, wherein in the defocusing operation, the at least one processor is configured to:
   set a width of the at least one beam based on at least one of a radial distance of the virtual focal point from the node or the width of the enabled surface area of the node.

25. The apparatus of claim 16, wherein in the defocusing operation, the at least one processor is configured to:
   set an azimuth or an elevation of the at least one beam based on an azimuth or an elevation of the virtual focal point.

26. The apparatus of claim 16, wherein in the defocusing operation, the at least one processor is configured to:
   defocus the at least one beam in both azimuth and elevation.

27. The apparatus of claim 16, wherein in the defocusing operation, the at least one processor is configured to:
   defocus the at least one beam in one of azimuth or elevation; and
   focus the at least one beam in the other of azimuth or elevation.

28. The apparatus of claim 16, wherein the at least one beam is based further on a radial distance of the at least one UE from the node.

29. The apparatus of claim 16, further comprising a transceiver coupled to the at least one processor.

30. A method of wireless communication at a node, comprising:
   receiving, from a base station, an indication to adjust a surface phase of the node corresponding to one or more beams toward the node or at least one of a plurality of beams from the node for communication with at least one user equipment (UE), the one or more beams corresponding to the plurality of beams; and
   sending, via the at least one beam of the plurality of beams, communication from the base station to the at least one UE or communication from the at least one UE to the base station, the at least one beam being based on a defocusing operation in connection with a virtual focal point and at least one of: an azimuth or an elevation of the at least one beam, a random access channel (RACH) message from the UE, a reference signal received power (RSRP) measurement of the at least one beam, or a width or a height of an enabled surface area of the node.

* * * * *